US010976998B2

(12) United States Patent
Ono

(10) Patent No.: US 10,976,998 B2
(45) Date of Patent: Apr. 13, 2021

(54) INFORMATION PROCESSING APPARATUS AND INFORMATION PROCESSING METHOD FOR CONTROLLING A RESPONSE TO SPEECH

(71) Applicant: SONY CORPORATION, Tokyo (JP)

(72) Inventor: Junya Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/318,829

(22) PCT Filed: Jul. 21, 2017

(86) PCT No.: PCT/JP2017/026399
§ 371 (c)(1),
(2) Date: Jan. 18, 2019

(87) PCT Pub. No.: WO2018/055898
PCT Pub. Date: Mar. 29, 2018

(65) Prior Publication Data
US 2019/0163438 A1 May 30, 2019

(30) Foreign Application Priority Data

Sep. 23, 2016 (JP) .............................. JP2016-186151

(51) Int. Cl.
G10L 15/22 (2006.01)
G06F 3/16 (2006.01)
G10L 13/08 (2013.01)
G10L 15/10 (2006.01)
G06F 3/01 (2006.01)

(52) U.S. Cl.
CPC .............. G06F 3/167 (2013.01); G06F 3/012 (2013.01); G10L 13/08 (2013.01); G10L 13/086 (2013.01); G10L 15/10 (2013.01)

(58) Field of Classification Search
CPC ........... G10L 2021/02165; G10L 2021/02166; H04R 3/005
See application file for complete search history.

(56) References Cited

U.S. PATENT DOCUMENTS

2004/0141418 A1* 7/2004 Matsuo ................... G01S 11/14
367/124
2007/0021958 A1* 1/2007 Visser ................. G10L 21/0272
704/226

(Continued)

FOREIGN PATENT DOCUMENTS

EP 2509070 A1 10/2012
WO WO 2016/049439 A1 3/2016

OTHER PUBLICATIONS

Aug. 9, 2019, European Search Report issued for related EP Application No. 17852679.4.

Primary Examiner — Jialong He
(74) Attorney, Agent, or Firm — Paratus Law Group, PLLC

(57) ABSTRACT

There is provided an information processing apparatus and an information processing method, the information processing apparatus including: an acquiring unit configured to acquire position information of a microphone which has accepted a speech; and a response control unit configured to control a response to the speech on a basis of the speech and the position information.

13 Claims, 14 Drawing Sheets

(56) References Cited

U.S. PATENT DOCUMENTS

| | | | | |
|---|---|---|---|---|
| 2007/0038444 | A1* | 2/2007 | Buck | B60R 16/0373 |
| | | | | 704/235 |
| 2007/0280486 | A1* | 12/2007 | Buck | H04S 7/301 |
| | | | | 381/92 |
| 2008/0270131 | A1* | 10/2008 | Fukuda | G10L 15/20 |
| | | | | 704/246 |
| 2009/0055178 | A1* | 2/2009 | Coon | G10L 17/00 |
| | | | | 704/246 |
| 2012/0065973 | A1* | 3/2012 | Cho | G10L 21/00 |
| | | | | 704/246 |
| 2013/0297319 | A1* | 11/2013 | Kim | G10L 15/22 |
| | | | | 704/275 |
| 2015/0016628 | A1* | 1/2015 | Li | H04R 3/005 |
| | | | | 381/92 |

* cited by examiner

FIG. 14

```
Content-Type: multipart/form-data; boundary=---multipart_boundary

---multipart_boundary
Content-Disposition: form-data; name="json"
Content-Type: application/json {"AnalysisPattern":{ "Domain": 1, "Slot": 1, "Personalization": 1}}

---multipart_boundary
Content-Disposition: form-data; name="file"; filename="speech.bin"
Content-Type: application/octet-stream
Content-Transfer-Encoding: binary 1234 5678 9ABCD EF01 0123 4567 89AB CDEF ---multipart_boundary--
```

FIG. 15

```
Content-Disposition: form-data; name="json"
Content-Type: application/json
{ "AnalysisPattern": { "Domain" : 1}, { "Slot": 1 }, { "Personalization" : 1 }
```

FIG. 16

```
Content-Disposition: form-data; name="file";
filename="speech.bin"
Content-Type: application/octet-stream
Content-Transfer-Encoding: binary
1234 5678 9ABCD EF01 0123 4567 89AB CDEF
```

FIG. 17

```
{
    "SpeechRecognitionResult": " PLEASE SHOW ME SCHEDULE OF MY CHILD ",
    "SpeechAuthorInfo" : {
        "UserId" : "XXX",
        "UserName": " TARO TANAKA ",
        "UserAddress" : "TTT"
    },
    "SemanticFrameResults": [
        {
            "Domain": "SCHEDULE-VIEW",
            "Score": 0.8,
            "SlotSets" : [
                {
                    "ScheduleInfo":
                        "Subject" : "NONE
                        "DateValue" : "NONE"
                }
            ]
        }
    ]
}
```

INFORMATION PROCESSING APPARATUS AND INFORMATION PROCESSING METHOD FOR CONTROLLING A RESPONSE TO SPEECH

CROSS REFERENCE TO PRIOR APPLICATION

This application is a National Stage Patent Application of PCT International Patent Application No. PCT/JP2017/026399 (filed on Jul. 21, 2017) under 35 U.S.C. § 371, which claims priority to Japanese Patent Application No. 2016-186151 (filed on Sep. 23, 2016), which are all hereby incorporated by reference in their entirety.

TECHNICAL FIELD

The present disclosure relates to an information processing apparatus and an information processing method.

BACKGROUND ART

A technology of generating a response to a speech by a user and presenting the generated response to the user who has made the speech is disclosed (see, for example, Patent Literature 1).

CITATION LIST

Patent Literature

Patent Literature 1: JP 2016-502192T

DISCLOSURE OF INVENTION

Technical Problem

To obtain a response which is desired by a user, for example, it can be considered that the user makes a speech including response control information for controlling the response. However, if the speech includes the response control information, a speech sentence becomes complicated, and there is a possibility that load on the user may increase.

Therefore, the present disclosure proposes a new and improved information processing apparatus and information processing method which enables a response desired by a user to be made while reducing load on the user.

Solution to Problem

According to the present disclosure, there is provided an information processing apparatus including: an acquiring unit configured to acquire position information of a microphone which has accepted a speech; and a response control unit configured to control a response to the speech on a basis of the speech and the position information.

According to the present disclosure, there is provided an information processing apparatus including: a communication unit configured to transmit position information of a microphone which has accepted a speech and receive response information relating to a response to the speech, the response information being based on the speech and the position information; and a processing unit configured to perform processing on a basis of the response information.

In addition, according to the present disclosure, there is provided an information processing method including: acquiring position information of a microphone which has accepted a speech; and controlling, by a processor, a response to the speech on a basis of the speech and the position information.

In addition, according to the present disclosure, there is provided an information processing method including: transmitting position information of a microphone which has accepted a speech and receiving response information relating to a response to the speech, the response information being based on the speech and the position information; and performing processing by a processor on a basis of the response information.

Advantageous Effects of Invention

As described above, according to the present disclosure, it is possible to make a response desired by a user while reducing load on the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is an explanatory diagram illustrating an example of transmission data of the client terminal 2 according to the application example.

FIG. 15 is an explanatory diagram illustrating an example of information indicating an analysis pattern expressed in a JSON format according to the application example.

FIG. 16 is an explanatory diagram illustrating an example of a value of sound data according to the application example.

FIG. 17 is an explanatory diagram illustrating received data of a client terminal 2 according to the application example.

MODE(S) FOR CARRYING OUT THE INVENTION

Figure 1:
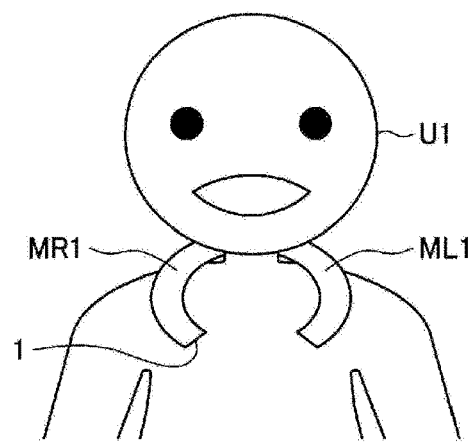
FIG. 1 is an explanatory diagram for explaining outline of an information processing apparatus 1 according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
<<1. Introduction>>
<1-1. Background>
<1-2. Outline>
<<2. Configuration example>>
<2-1. Overall configuration>
<2-2. Details of control unit>
<<3. Operation example>>
<3-1. Processing flow>
<3-2. Specific example of response control>
<<4. Application examples>>
<4-1. Application example 1>
<4-2. Application example 2>
<4-3. Application example 3>
<4-4. Application example 4>
<<5. Hardware configuration example>>
<<6. Conclusion>>

1. INTRODUCTION

1-1. Background

Before an information processing apparatus according to an embodiment of the present disclosure is described, first, background of creation of the information processing apparatus according to an embodiment of the present disclosure will be described.

In recent years, a device called a so-called wearable device, which is directed to being used while being worn by a user is emerging. While the wearable device includes, for example, devices in various forms such as a spectacle type, a wristwatch type and a neck band type, it is often the case that a screen of such a wearable device is small or such a wearable device does not have a screen. Therefore, in the case where the user performs input to such a wearable device, it is assumed that the user performs input by speaking (making a speech) to the device instead of directly manipulating a screen. Further, even for a wearable device including an input function other than sound input, input by a speech is effective in the case where it is difficult for the user to use his/her hands such as during driving, cooking, or the like.

Further, in the case where a response is made using a device whose screen is small or which does not have a screen, for example, a response can be made using sound. In a response using sound, because it can take a long time to present, for example, detailed information, while there is a case where a response including only outline is desired depending on users, there is also a case where a response including detailed information is desired even if it takes a long time.

In this manner, to obtain a response desired by the user, it can be considered that the user makes a speech including, for example, response control information for controlling a response (such as, for example, "please let me know tomorrow's weather in detail"). However, if the response control information is included in the speech, because a speech sentence becomes complicated, a possibility of occurrence of an error in speech recognition and semantic analysis can increase, and load on the user can increase.

Therefore, the present discloser has created the present embodiment in view of the above-described circumstances. According to the present embodiment, it is possible to make a response desired by a user without making a speech sentence complicated. Outline of an embodiment of the present disclosure having such an effect will be described below with reference to FIG. 1 to FIG. 3.

1-2. Outline

Outline of the information processing apparatus according to an embodiment of the present disclosure will be described below. Note that details of the information processing apparatus according to the present embodiment will be described later with reference to FIG. 4.

Figure 2:
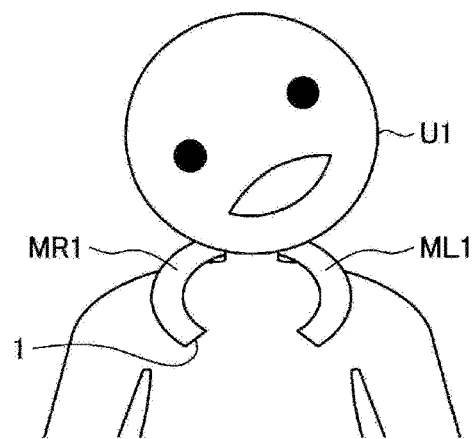
FIG. 2 is an explanatory diagram for explaining outline of the information processing apparatus 1 according to the embodiment.
Figure 3:
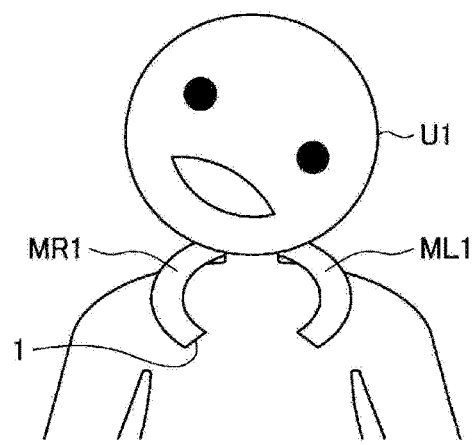
FIG. 3 is an explanatory diagram for explaining outline of the information processing apparatus 1 according to the embodiment.

FIG. 1 to FIG. 3 are explanatory diagrams for explaining outline of the information processing apparatus 1 according to the present embodiment. As illustrated in FIG. 1, the information processing apparatus 1 is, for example, a neck band type wearable device, and is worn around the neck of a user U1. Further, the information processing apparatus 1 includes a right microphone MR1 provided on a right side seen from the user U1, and a left microphone ML1 provided on a left side seen from the user U1, and collects sound of the user U1 to acquire a speech.

Here, for example, as illustrated in FIG. 2, the user U1 can make a speech to the left microphone ML1 or, as illustrated in FIG. 3, can make a speech to the right microphone MR1. The information processing apparatus 1 according to the present embodiment acquires position information of a microphone which has accepted the speech by the user U1 as described above and performs response control on the basis of the position information.

For example, in the example illustrated in FIG. 2 and in the example illustrated in FIG. 3, even if the user U1 makes the same speech, the information processing apparatus 1 can output different responses in the example illustrated in FIG. 2 and in the example illustrated in FIG. 3.

For example, the information processing apparatus 1 may perform response control so that a response in the example illustrated in FIG. 3 includes a more information amount of (more detailed) information to be presented to the user U1 than an information amount of a response in the example illustrated in FIG. 2. Note that the response control by the information processing apparatus 1 is not limited to this example, and various examples of response control will be described later.

Further, while FIG. 1 to FIG. 3 illustrate an example where the information processing apparatus 1 is a neck band type wearable device, the information processing apparatus according to the present technology is not limited to this example. Other apparatus examples of the present technology will be described later as application examples of the present technology.

The outline of the information processing apparatus 1 according to the present embodiment has been described above. According to the information processing apparatus 1 according to the present embodiment, by controlling a response on the basis of position information of a microphone which has accepted a speech, for example, even if the user makes the same speech, it is possible to make various kinds of responses. Therefore, it is possible to make a response desired by the user without making a speech sentence complicated. A detailed configuration of the information processing apparatus 1 for realizing such an effect will be described below with reference to FIG. 4.

2. CONFIGURATION EXAMPLE

Figure 4:
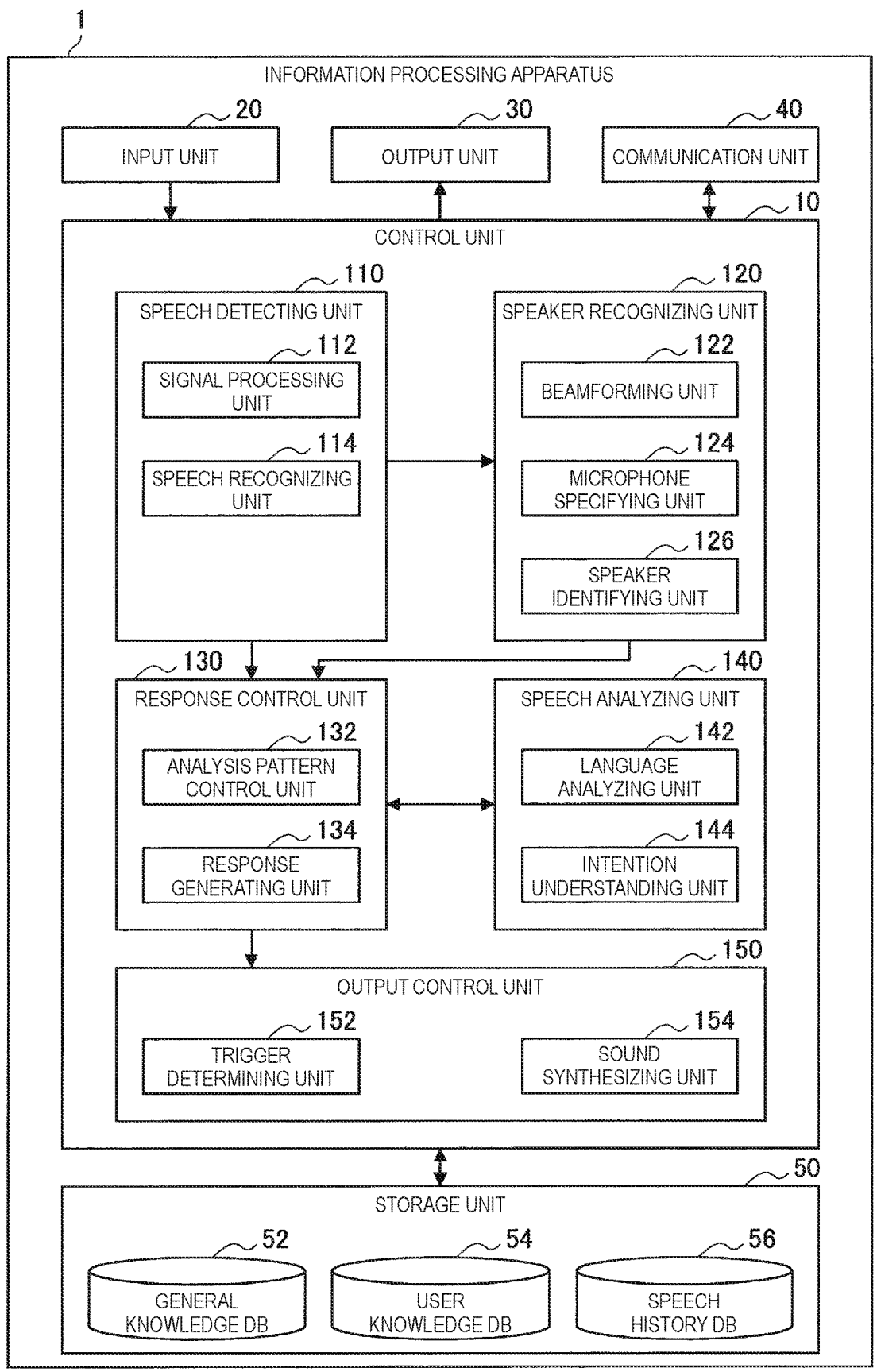
FIG. 4 is a block diagram illustrating a configuration example of the information processing apparatus 1 according to the embodiment.

FIG. 4 is a block diagram illustrating a configuration example of the information processing apparatus 1 according to an embodiment of the present disclosure. As illustrated in FIG. 4, the information processing apparatus 1 according to the present embodiment includes a control unit 10, an input unit 20, an output unit 30, a communication unit 40 and a storage unit 50. The control unit 10 will be described in detail below after an overall configuration of the information processing apparatus 1 is described.

2-1. Overall Configuration

The control unit 10 controls each component of the information processing apparatus 1. For example, the control unit 10 controls the output unit 30 on the basis of a speech of the user input from the input unit 20 to output a response to the speech of the user. Note that a detailed configuration of the control unit 10 will be described later.

The input unit 20 accepts input of the user, and, in the present embodiment, is provided at the information processing apparatus 1 to accept a speech from the user. The input unit 20 according to the present embodiment includes a plurality of microphones for collecting sound of the user, and, for example, may include the right microphone MR1 and the left microphone ML1 illustrated in FIG. 1 to FIG. 3. Further, the input unit 20 may include three or more microphones, in which case, accuracy of beamforming processing which will be described later can be improved.

Note that the input unit 20 is not limited to a microphone, and, for example, may include a camera, a depth sensor, or the like. The input unit 20 transmits data generated through input operation by the user to the control unit 10.

The output unit 30 performs output in accordance with control by the control unit 10. In the present embodiment, the output unit 30 outputs a response to the speech of the user. The output unit 30 may include, for example, a speaker which outputs sound, a display which displays characters, images and other visual information, a lamp which outputs light, a vibration device which outputs vibration, or the like.

The communication unit 40 communicates information with other apparatuses. For example, the communication unit 40 can acquire information which becomes a basis of the response to the speech of the user from other apparatuses by communicating information with other apparatuses on the basis of control by the control unit 10.

The storage unit 50 stores programs and parameters to be used by each component of the information processing apparatus 1 to function. Further, as illustrated in FIG. 4, the storage unit 50 stores a general knowledge DB 52, a user knowledge DB 54 and a speech history DB 56. The general knowledge DB 52 is a database including graph-structured general knowledge. Further, the user knowledge DB 54 is a database including graph-structured knowledge specific to the user regarding the user. Further, the speech history DB 56 is a database including graph-structured speech history of the user. The general knowledge DB 52, the user knowledge DB 54 and the speech history DB 56 may be referred to by the control unit 10 and may be updated by the control unit 10 as will be described later.

2-2. Details of Control Unit

The overall configuration example of the information processing apparatus 1 according to the present embodiment has been described above. Subsequently, a functional configuration of the control unit 10 provided at the information processing apparatus 1 will be described in more detail.

As illustrated in FIG. 4, the control unit 10 according to the present embodiment has functions as a speech detecting unit 110, a speaker recognizing unit 120, a response control unit 130, a speech analyzing unit 140 and an output control unit 150.

(Speech Detecting Unit)

The speech detecting unit 110 detects that the user has made a speech to the input unit 20. Then, if the speech detecting unit 110 detects that the user has made a speech, the speech detecting unit 110 converts content of the speech into text, and extracts speech text. Further, if the speech detecting unit 110 detects that the user has made a speech, the speech detecting unit 110 outputs sound in a segment of the speech to the speech recognizing unit 120 which is provided in a stage subsequent to the speech detecting unit 110. Further, the speech detecting unit 110 transmits the content of the speech converted into text (speech text) to the response control unit 130.

As illustrated in FIG. 4, the speech detecting unit 110 includes a signal processing unit 112 and a speech recognizing unit 114.

The signal processing unit 112 executes signal processing on sound data transmitted from the input unit 20 to improve accuracy of speech recognition. The signal processing unit 112 performs signal processing of removing noise and echo from the sound data to improve accuracy of speech recognition, for example, in a far field.

The speech recognizing unit 114 performs processing of accepting that the user has made a speech and speech recognition processing on the sound data subjected to signal processing at the signal processing unit 112 to convert the speech into text.

For example, the speech recognizing unit 114 accepts that the user has made a speech and detects a speech segment of the user. By limiting a speech portion by accepting that the user has made a speech and detecting a speech segment of the user in this manner, it is possible to improve accuracy of speech recognition. Further, by limiting a speech portion by accepting that the user has made a speech and detecting a speech segment of the user, it is possible to limit a processing period of speech recognition and realize power saving.

Further, the speech recognizing unit 114 executes speech recognition processing on the detected speech segment of the user to convert sound (speech) into text. Processing of converting sound into text is not limited to specific processing.

(Speaker Recognizing Unit)

The speaker recognizing unit 120 specifies a speaker who has made a speech to the input unit 20. Further, the speaker recognizing unit 120 according to the present embodiment also functions as an acquiring unit which acquires position information of a microphone which has accepted a speech.

As illustrated in FIG. 4, the speaker recognizing unit 120 includes a beamforming unit 122, a microphone specifying unit 124, and a speaker identifying unit 126.

The beamforming unit 122 specifies a direction in which the speech is made from a phase difference obtained through beamforming by a plurality of microphones provided as the input unit 20.

The microphone specifying unit 124 acquires position information of the microphone which has accepted the speech by specifying the microphone which has accepted the speech from the direction in which the speech has been made specified by the beamforming unit 122, and a volume of sound.

In the present embodiment, as described with reference to FIG. 1, the information processing apparatus 1 includes the right microphone MR1 provided on the right side seen from the user, and the left microphone ML1 provided on the left side seen from the user. For example, in the case where the microphone which has accepted the speech is specified as the right microphone MR1, the microphone specifying unit 124 may acquire position information indicating right. Further, in the case where the microphone which has accepted the speech is the left microphone ML1, the microphone specifying unit 124 may acquire position information indicating left.

Note that the position information acquired by the microphone specifying unit 124 does not have to correspond to the microphones provided at the information processing apparatus 1 on a one-to-one basis. For example, as in the example illustrated in FIG. 1, in the case where the user U1 makes a speech toward a center between the right microphone MR1 and the left microphone ML1, the microphone specifying unit 124 may acquire position information indicating the center.

The speaker identifying unit 126 executes processing of specifying a person (speaker) who has made a speech. The speaker identifying unit 126, for example, specifies the person (speaker) in the direction in which the speech has been made specified by the beamforming unit 122 through face recognition processing on an image captured through a camera provided as the input unit 20. Further, the speaker identifying unit 126 may, for example, analyze sound of the speech to specify the person who has made the speech on the basis of a sound waveform. Note that the speaker identifying unit 126 may make an inquiry at the user knowledge DB 54 stored in the storage unit 50 to specify the person who has made the speech and acquire profile information of the person stored in the user knowledge DB 54. Further, the speaker identifying unit 126 may acquire the profile information of the specified person who has made the speech from the user knowledge DB 54 and provide the profile information to the response control unit 130.

(Response Control Unit)

The response control unit 130 controls a response to the speech on the basis of the speech of the user and the position information of the microphone which has accepted the speech. For example, the response control unit 130 controls the response by generating response information relating to the response to the speech and transmits the response information to the output control unit 150. Further, the response control unit 130 transmits the speech text and information indicating a speech analysis pattern which will be described later to the speech analyzing unit 140.

As illustrated in FIG. 4, the response control unit 130 includes an analysis pattern control unit 132 and a response generating unit 134.

The analysis pattern control unit 132 controls the speech analysis pattern by the speech analyzing unit 140 which will be described later on the basis of the position information of the microphone which has accepted the speech. The analysis pattern control unit 132 according to the present embodiment determines whether or not to apply an analysis pattern on the basis of the position information of the microphone which has accepted the speech and transmits information indicating the speech analysis pattern to be applied to the speech analyzing unit 140. Note that, while the speech analysis pattern will be described later, for example, the speech analysis pattern for which the analysis pattern control unit 132 determines application may be domain complement, slot complement and personalization.

As described above, because the response information to be generated by the response generating unit 134 which will be described later is different by the analysis pattern control unit 132 controlling the speech analysis pattern on the basis of the position information of the microphone which has accepted the speech, the response can be controlled.

The response generating unit 134 controls the response by generating the response information relating to the response to the speech on the basis of an analysis result of the speech by the speech analyzing unit 140 and the position information of the microphone. Further, the response generating unit 134 may control the response by generating the response information in accordance with the speaker specified by the speaker recognizing unit 120. Note that the response generating unit 134 may generate the response information on the basis of, for example, information acquired from the databases stored in the storage unit 50, information acquired from other apparatuses which are not illustrated via the communication unit 40, or the like.

The response information may include, for example, text information to be presented to the user through sound, display, or the like. Further, the response information may include information converted into a data format to be presented to the user, such as acoustic data and image data. Further, the response information may include information of predetermined conditions to be used by the output control unit 150 which will be described later to determine an output timing, in which case, the response generating unit 134 can control an output timing of the response. Further, the response information may include information indicating modal of the response (a method for presenting the response to the user, such as reading of text, display of text, and display of images).

Note that an example of the response control by the response control unit 130 will be described later.

(Speech Analyzing Unit)

The speech analyzing unit 140 analyzes content of the speech detected by the speech detecting unit 110. The speech analyzing unit 140 analyzes content of the speech detected by the speech detecting unit 110 through language analysis, semantic analysis, or the like. Then, as a result of the speech analyzing unit 140 analyzing the content of the speech detected by the speech detecting unit 110, if the content of the speech is a question sentence, the speech analyzing unit 140 makes an inquiry at databases stored in the storage unit 50 and acquires necessary information. Further, the speech analyzing unit 140 transmits the analysis result of the speech to the response control unit 130.

As illustrated in FIG. 4, the speech analyzing unit 140 includes a language analyzing unit 142 and an intention understanding unit 144.

The language analyzing unit 142 analyzes a structure of the speech text converted by the speech detecting unit 110. The language analyzing unit 142 can, for example, determine whether or not the content of the speech by the user is a question by analyzing the structure of the speech text.

The intention understanding unit 144 analyzes the speech text converted by the speech detecting unit 110 to generate a semantic frame (table structure) which expresses a domain (operation command) and a slot (auxiliary information). In the present embodiment, the domain corresponds to, for example, a category of application (such as, for example, weather application and schedule application) to be executed by the information processing apparatus 1. Further, in the present embodiment, the slot corresponds to a parameter to be passed to the application.

For example, a semantic frame generated by analyzing speech text of "please let me know tomorrow's weather in TUL" is as indicated in the following Table 1. In the example indicated in Table 1, "Weather-Check" is input as the domain, "Tomorrow" is input as a date slot, and "TUL" is input as a place slot.

TABLE 1

Semantic frame before normalization

| Attribute | Value |
| --- | --- |
| Domain | Weather-Check |
| Slot (Date) | Tomorrow |
| Slot (Place) | TUL |

Further, the intention understanding unit 144 interprets vague expression included in the speech text converted by the speech detecting unit 110 to interpret intention of the speech by the user, and normalizes information. For example, the intention understanding unit 144 interprets vague expression by making an inquiry at the databases stored in the storage unit 50.

Table 2 is a table indicating an example of a semantic frame obtained by the intention understanding unit 144 normalizing the semantic frame indicated in Table 1. Because it is difficult to perform processing with date expression of "Tomorrow", the intention understanding unit 144 may normalize the expression to time expression. Further, because place expression of "TUL" is vague, the intention understanding unit 144 normalizes the expression to "Tokyo Universal Land" by making an inquiry at the general knowledge DB 52 stored in the storage unit 50.

TABLE 2

Semantic frame after normalization

| Attribute | Value |
| --- | --- |
| Domain | Weather-Check |
| Slot (Date) | YYYY:MM:DD |
| Slot (Place) | Tokyo Universal Land |

Further, the intention understanding unit 144 may analyze the speech text in accordance with the information indicating the analysis pattern provided from the response control unit 130. For example, in the case where information indicating the domain complement is provided as the information indicating the analysis pattern, the intention understanding unit 144 may complement (take over) the domain in the semantic frame from a previous speech. Further, in the case where information indicating the slot complement is provided as the information indicating the analysis pattern, the intention understanding unit 144 may complement the slot in the semantic frame from the previous speech. Note that the intention understanding unit 144 may perform the above-described complement on the basis of history of speeches stored in the speech history DB 56 stored in the storage unit 50.

By the domain or the slot being complemented from the previous speech as described above, in the case where, for example, necessary information is not included in speech text at one time, and the speech is made in a divided manner, it is possible to complement information.

Further, in the case where the information indicating application of the personalization is provided as the information indicating the analysis pattern, the intention understanding unit 144 may perform analysis optimized for the user (for example, the speaker). For example, in the case where the information indicating application of the personalization is provided as the information indicating the analysis pattern, the intention understanding unit 144 may make an inquiry at the user knowledge DB 54 stored in the storage unit 50 to acquire profile information of the user, and normalize the semantic frame on the basis of the profile information of the user.

According to such a configuration, an analysis result optimized for the user is provided to the response control unit 130, so that the response control unit 130 can generate the response information optimized for the user.

By the information processing apparatus 1 having the above-described function of analyzing the speech using the analysis pattern based on the position information of the microphone which has accepted the speech, the user can provide also information not included in the speech text to the information processing apparatus 1 by selecting the microphone.

(Output Control Unit)

The output control unit 150 controls output by the output unit 30. For example, the output control unit 150 causes the response to be output on the basis of the response information provided from the response control unit 130. Further, the output control unit 150 may control an output timing of the response.

Further, the output control unit 150 may control the output unit 30 so at to feed back the position information of the microphone which has accepted the speech to the user. For example, light, sound, vibration, or the like, may be output from a position in accordance with the position information of the microphone which has accepted the speech by control by the output control unit 150. According to such a configuration, the user (speaker) can confirm whether or not the microphone which has accepted the speech is specified as intended.

As illustrated in FIG. 4, the output control unit 150 includes a trigger determining unit 152 and a sound synthesizing unit 154.

The trigger determining unit 152 determines an output timing of the response. The information processing apparatus 1 according to the present embodiment has two types of modes of a mode in which the response is output in real time, and a mode in which the response is output at a time point at which predetermined conditions are satisfied. The mode in which the response is output in real time is also referred to as a real time mode, and the mode in which the response is output at a time point at which the predetermined conditions are satisfied is also referred to as a bookmark mode. The predetermined conditions used by the trigger determining unit 152 may be, for example, that content being output is put into a predetermined state or, for example, that predetermined time has come.

The predetermined state of the content being output may be, for example, a timing at which the content ends, or may be a timing of commercial if the content is a TV program. The timing at which the content ends can include both a timing at which the content is reproduced to the end, and a timing at which the user explicitly finishes reproduction of the content. The above-described predetermined time includes both time which has come relatively after end time of the content, and time irrelevant to end of the content. Note that, in the case where the response is output on condition that the predetermined time has come, the predetermined conditions to be used by the trigger determining unit 152 may include a condition that the content is not being output.

Further, the predetermined conditions to be used by the trigger determining unit 152 are not limited to the above, and may be that application, the information processing apparatus 1 or other apparatuses are put into a predetermined state. For example, the predetermined state may be a state where predetermined application is finished, a state where the information processing apparatus 1 is put into a preparatory state where the information processing apparatus 1 is powered off, or the like. Further, in the case where the present technology is applied to a car as will be described later, the predetermined state may be a state where an engine of the car is turned off, a state where a brake pedal is depressed and the car stops, a state where navigation is finished, or the like.

As described above, by controlling the output timing of the response, for example, it is possible to output the response at a timing which is more desirable for the user without inhibiting action which is currently being performed by the user.

The sound synthesizing unit 154 converts text information into sound data in the case where the response information includes text information to be read.

The configuration of the information processing apparatus 1 according to the present embodiment has been specifically described above. Note that the configuration of the information processing apparatus 1 illustrated in FIG. 4 is an example, and the present embodiment is not limited to this. For example, each function of the control unit 10 according to the present embodiment may be provided at other information processing apparatuses connected via the communication unit 40. Such examples will be described later as application examples.

3. OPERATION EXAMPLE

Subsequently, an operation example of the information processing apparatus 1 according to the present embodiment will be described. In the following description, first, processing flow will be described with reference to FIG. 5, and, then, specific examples of response control according to the present embodiment will be described.

3-1. Processing Flow

Figure 5:
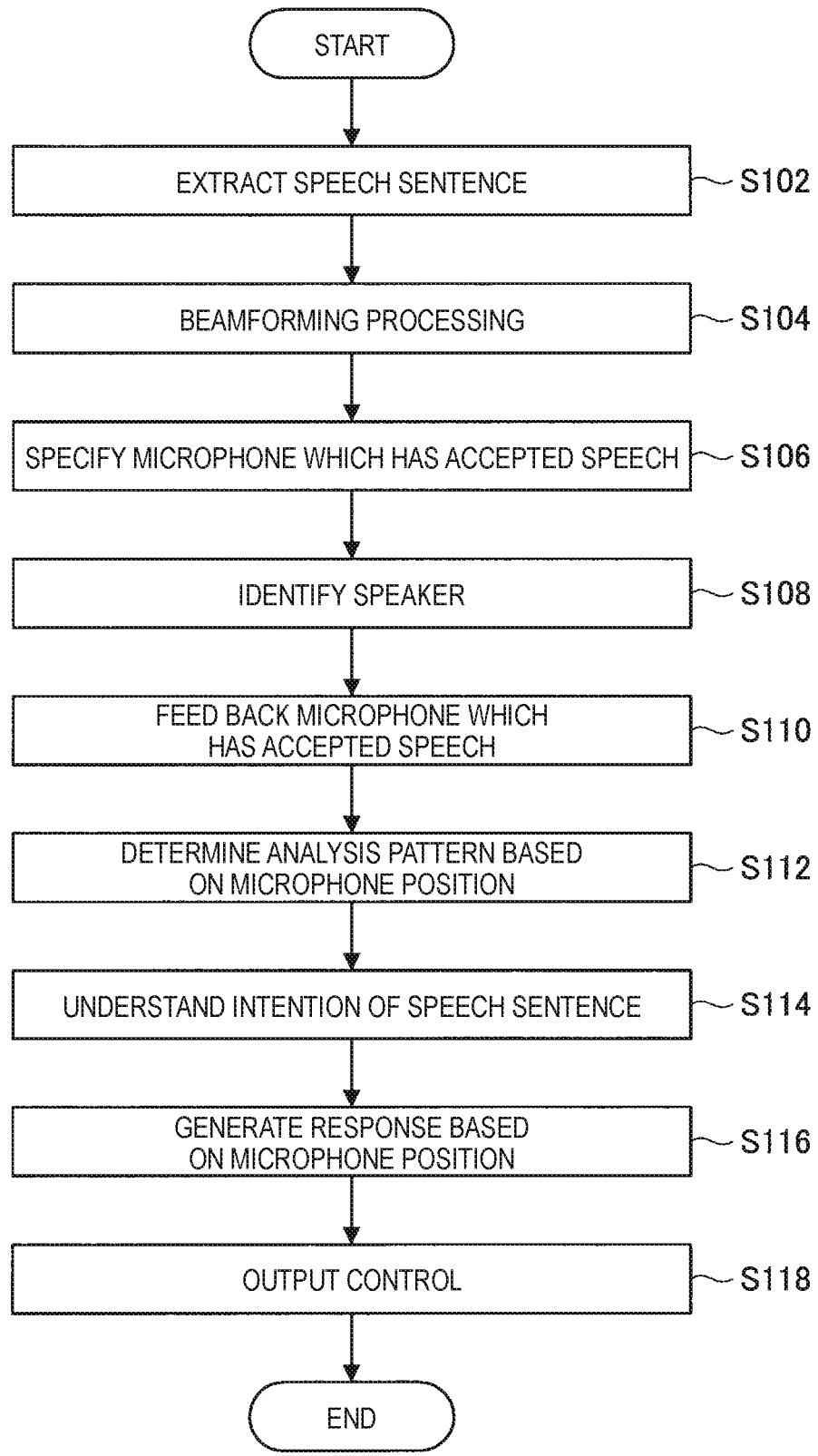
FIG. 5 is a flowchart illustrating an example of processing flow of the information processing apparatus 1 according to the embodiment.

FIG. 5 is a flowchart illustrating an example of processing flow of the information processing apparatus 1 according to the present embodiment. As illustrated in FIG. 5, first, the speech detecting unit 110 detects a speech and extracts a speech sentence (speech text) (S102).

Subsequently, the beamforming unit 122 performs beamforming processing and specifies a direction in which the speech has been made (S104). Further, the microphone specifying unit 124 specifies a microphone which has accepted the speech from the direction in which the speech has been made specified in step S104, and a volume of sound and acquires position information of the microphone which has accepted the speech (S106). Subsequently, the speaker identifying unit 126 specifies a person (speaker) who has made the speech (S108).

Subsequently, the position information of the microphone which has accepted the speech is fed back to the user by control by the output control unit 150 (S110).

Subsequently, the analysis pattern control unit 132 determines an analysis pattern in speech analysis on the basis of the position information of the microphone which has accepted the speech (S112). The speech analyzing unit 140 analyzes the speech sentence (speech text) using the analysis pattern determined in step S112 to acquire a semantic frame.

Subsequently, the response generating unit 134 generates response information on the basis of an analysis result of the speech (semantic frame) and the position information of the microphone which has accepted the speech (S116). Further, the output control unit 150 performs output control of causing a response to be output on the basis of the response information (S118).

3-2. Specific Example of Response Control

An example of the processing flow of the information processing apparatus 1 according to the present embodiment has been described above. Subsequently, specific examples of the above-described response control by the response control unit 130 will be described. In the following description, a case will be described as an example where the position information of the microphone which has accepted the speech (hereinafter, also referred to as a speech position) is mainly "left" or "right".

(Information Amount)

The response control unit 130 may control an information amount included in the response on the basis of the speech position. For example, the response control unit 130 may generate the response information so that a more information amount is included in the response in the case where the speech position is "right" than in the case where the speech position is "left". Further, to prevent the user from wavering, it is desirable that the response is controlled so that consistent relationship is maintained between the above-described speech position and the information amount in all kinds of application service.

Note that, while it depends on cultural areas, because a person perceives that information flows from left to right, a state where a more information amount is included in the case where the speech position is "right" than in the case where the speech position is "left" matches perception by a person.

For example, the response control unit 130 may control depth (minuteness) of the information on the basis of the speech position. An example in weather application and an example in news application will be described below.

For example, in the case where the user makes a speech of "please let me know tomorrow's weather in Tokyo", if the speech position is "left", response information including minimum information (such as sunny/cloudy/rainy) may be generated, while, if the speech position is "right", response information including more detailed information (such as a maximum/minimum temperature and sunny from the night)

in addition to the minimum information may be generated. For example, if the speech position is "left", a response such as "the tomorrow's weather in Tokyo is sunny" may be output. Meanwhile, if the speech position is "right", a response such as "the tomorrow's weather in Tokyo is, the maximum temperature is 30° C., the minimum temperature is 20° C., and rainy from the night" may be output.

Further, in the case where the user makes a speech of "please let me know news of Kei Nishikori", if the speech position is "left", response information including less information may be generated, while, if the speech position is "right", response information including more detailed information may be generated. For example, if the speech position is "left", a response such as "Nishikori faced off against Karottibi in a fourth-round match" may be output. Meanwhile, if the speech position is "right", a response such as "Nishikori ran to the fourth round in the sixth day of the US Open Tennis Championships, and faced off against Karottibi" may be output.

Further, the response control unit 130 may control a range (length) of the information on the basis of the speech position. An example in music application will be described below.

For example, in the case where the user makes a speech for requesting reproduction of a music, if the speech position is "left", response information including short sound data (for example, only a hook-line portion of the music) like a preview may be generated, while, if the speech position is "right", response information including sound data of the whole music may be generated. Note that, before the music is reproduced, a response regarding the range of the information (such as, for example, "only a hook-line portion will be reproduced" and "a full-length music will be reproduced") may be output.

(Coordination with Time Direction)

The response control unit 130 may control a response so that a time direction relating to the response corresponds to the speech position. For example, the response control unit 130 may generate response information such that, in the case where the speech position is "left", past information is included, in the case where the speech position is the "center", current information is included, and, in the case where the speech position is "right", future information is included. Further, to prevent the user from wavering, it is desirable that the response is controlled so that consistent relationship is maintained between the above-described speech position and the time direction in all kinds of application service.

Note that, while it depends on cultural areas, because a person perceives that information flows from left to right, a state where temporally later (future) information is included in the case where the speech position is "right" than in the case where the speech position is "left" matches perception by a person.

An example in schedule application will be described below.

For example, in the case where the user makes a speech of "please show me schedule of my child", if the speech position is "left", response information including past schedule may be generated, while, if the speech position is "right", response information including future schedule may be generated. Note that a reference of time may be time at which the speech is made (current time). Note that, in such an example, output of the response may be display on a display, or the like.

Further, in the case where the past information is output as a response, it is possible to utilize data (such as, for example, data of photos, moving images and sound) obtained at a past time point. Therefore, for example, in the case where the user makes a speech of "show me the athletic meet of my child", if the speech position is "left", photo data, moving image data or the like, in the past athletic meets may be included in the response information. Further, if the speech position is "right", response information including future schedule may be generated. In such an example, domains (in the above-described example, types of application) may be different in accordance with the speech positions.

(Coordination with Space)

The response control unit 130 may control a response so that the speech position corresponds to space relating to the response. For example, the response control unit 130 may generate response information such that, in the case where the speech position is "left", information on a left side of space is included, in the case where the speech position is the "center", information in the center of space is included, and in the case where the speech position is "right", information on a right side of space is included. Note that a direction in the space may be, for example, a direction originated from a front side of the user.

An example in map application will be described below.

For example, in the case where the user makes a speech of "search for a convenience store near here", if the speech position is "left", response information including a search result on a left side may be generated, while, if the speech position is "right", response information including a search result on a left side may be generated.

(Output Timing)

The response control unit 130 may control the output timing of the response in accordance with the speech position. For example, the output timing of the response may be controlled such that, if the speech position is "left", a response is output in real time, while, if the speech position is "right", a response is output at time point at which predetermined conditions are satisfied. In such a case, the response control unit 130 may control the output timing by generating information of a mode relating to the output timing (a real time mode or a bookmark mode) and response information including the predetermined conditions. An example in reminder application and an example in camera application will be described below.

For example, in the case where the user makes a speech of "call my father", the output timing of the response may be controlled such that, if the speech position is "left", a phone call is made in real time, while, if the speech position is "right", speech content is added to a TODO list, and the user is reminded of TODO (notification is output) at a time point at which predetermined conditions are satisfied. Note that, in such a case, sound regarding the output timing of the response (such as, for example, "calling Mr. *", and "added to TODO") may be output. Note that, in such an example, a phone call may be made after it is specified on the basis of profile information of the user stored in the user knowledge DB 54 that the father of the user is "*"

Further, in the case where the output timing is controlled, response information including information of responses of a plurality of users in the past may be generated on the basis of the profile information of the user stored in the user knowledge DB 54.

For example, in the case where a first user makes a speech of "buy milk" at the speech position on the "right", and a second user who is a family member of the first user makes a speech of "buy rice" at the speech position on the "right", respective pieces of speech content are added to respective TODO lists. Further, in the case where one of the users makes a speech of "show TODO lists of family members", a response of "what to buy is milk and rice" may be output on the basis of the profile information of the user stored in the user knowledge DB 54.

Further, in the case where the user makes a speech of "take a picture", if the speech position is "left", a picture is taken in real time, while, if the speech position is "right", a picture may be taken using a self-timer after a predetermined time period. Further, a picture is taken using a self-timer after a longer predetermined time period in the case where the speech position is "right" than in the case where the speech position is "left". Note that, in such a case, sound regarding a photographing timing (such as, for example, "a picture will be taken 3 seconds later" and "a picture will be taken 10 seconds later") may be output.

(Additional Information)

The response control unit 130 may control a response by determining whether or not to add additional information to response information in accordance with the speech position. An example in music application will be described below.

For example, the additional information may include information of a reason relating to the response to the speech including vague expression. For example, the response control unit 130 may generate response information which does not include a reason of the response in the case where the speech position is "left", and may generate response information including a reason of the response in the case where the speech position is "right".

For example, in the case where the user makes a speech for requesting reproduction of music, which includes vague expression (such as a speech not including a song title but including name of an artist), the response control unit 130 may generate response information which does not include a reason for selection of the music if the speech position is "light" and may generate response information including a reason for selection of the music if the speech position is "right". For example, in the case where the speech position is "right", a response such as "this is *** which is reproduced a number of times" and "this is your favorite song" may be output.

Further, the additional information to be added to the response information may be supplementary information (accumulated knowledge) regarding the response. In the case where the user makes a speech for requesting reproduction of music, for example, the response control unit 130 may generate response information which does not include accumulated knowledge in the case where the speech position is "left", and may generate response information including accumulated knowledge in the case where the speech position is "right". For example, in the case where the speech position is "right", a response such as "this song is awarded first place in music ranking" may be output.

(Search Range)

The response control unit 130 may control a search range relating to a response in accordance with the speech position. An example in map application will be described below.

For example, in the case where the user makes a speech of "search for a restaurant", if the speech position is "left", response information including a search result in a narrow search range (for example, within a one-kilometer radius) may be generated, while, if the speech position is "right", response information including a search result in a wide search range (for example, within a five-kilometer radius) may be generated. Note that, in such a case, a response regarding the search range (such as, for example, "search is made within a one-kilometer radius" and "search is made within a five-kilometer radius") may be output. Further, a size of the search range (a value of a radius relating to the search) may be determined on the basis of, for example, a behavioral state (such as by car and on foot) of the user.

(Predetermined Functions)

The response control unit 130 may control a response on the basis of predetermined functions in accordance with the speech position. The predetermined functions may be, for example, functions allocated for each application or functions allocated by the user.

For example, the response control unit 130 may generate response information in the music application so that, if the speech position is "left", music is reproduced in a loop, while, if the speech position is "right", music is reproduced in a shuffled manner. By various kinds of functions being allocated, selection of the speech position can play a role as a shortcut function.

(Domain Complement)

The response control unit 130 may determine whether or not to apply the domain complement as the speech analysis pattern by the speech analyzing unit 140. For example, the response control unit 130 may provide information indicating application of the domain complement to the speech analyzing unit 140 as the analysis pattern in the case where the speech position is "left".

For example, a case will be described where, after the user makes a speech of "please let me know tomorrow's weather in Tokyo", the user makes a speech of "please let me know about Osaki". In the case where the speech position is "left", a domain (in this example, "Weather-Check") is complemented in speech analysis, and, for example, a response such as "Tomorrow's weather in Osaki is sunny" is output. Meanwhile, in the case where the speech position is "right", a domain is not complemented in speech analysis, and the domain is forcibly switched to analysis of terms, and, for example, a response such as "Osaki is geographical name in Shinagawa-ward in Tokyo, and is within an Osaki area" is output.

(Slot Complement)

The response control unit 130 may determine whether or not to apply the slot complement as the speech analysis pattern by the speech analyzing unit 140. For example, the response control unit 130 may provide information indicating application of the slot complement to the speech analyzing unit 140 as the analysis pattern in the case where the speech position is "left".

For example, a case will be described where, after the user makes a speech of "how is the tomorrow's weather in Tokyo?", the user makes a speech of "what is the schedule?". In the case where the speech position is "left", a date slot (in this example, "Tomorrow") is complemented in speech analysis, and, for example, a response such as "The tomorrow's schedule is ***" is output. Meanwhile, in the case where the speech position is "right", a slot is not complemented in speech analysis, and, because it is unclear the schedule about when the user requests, for example, a response for requesting information of date such as "schedule of when?" is output. Further, a case will be described where the user makes a speech of "how is the weather in the day after tomorrow?" following the above. In the case where the speech position is "left", a place slot (in this example, "Tokyo") is complemented in speech analysis, and, for example, a response such as "the weather in the day after tomorrow in Tokyo is rainy" is output. Meanwhile, in the case where the speech position is "right", a slot is not complemented in speech analysis, and, because it is unclear the weather about where the user requests, for example, a response for requesting information of a place such as "the weather of where?" is output.

(Personalization)

The response control unit 130 may determine whether or not to apply the personalization as the speech analysis pattern by the speech analyzing unit 140. For example, the response control unit 130 may provide information indicating application of the personalization to the speech analyzing unit 140 as the analysis pattern in the case where the speech position is "right".

For example, in the case where the user makes a speech for requesting reproduction of music including name of an artist to which a plurality of artists can correspond, if the speech position is "left", for example, music of the most popular artist among the corresponding artists may be reproduced by analysis being performed on the basis of general knowledge without the personalization being applied. Further, in such a case, if the speech position is "right", for example, music of an artist selected on the basis of interest, reproduction history, or the like, of the user (speaker) may be reproduced by analysis being performed while the personalization is applied.

The examples of the response control by the information processing apparatus 1 according to the present embodiment have been specifically described above. Note that the above-described response control is an example, the response control is not limited to this, and the information processing apparatus 1 according to the present embodiment can perform various kinds of response control.

4. APPLICATION EXAMPLES

The configuration examples and the operation examples according to an embodiment of the present disclosure have been described above. Subsequently, some application examples of the embodiment of the present disclosure will be described.

4-1. Application Example 1

While, in the above-described embodiment, an example has been described where the present technology is applied to a neck band type wearable device, the present technology is not limited to such an example. As an application example 1, an example where the present technology is applied to an in-vehicle device mounted on a car (an example of a vehicle) will be described.

Figure 6:
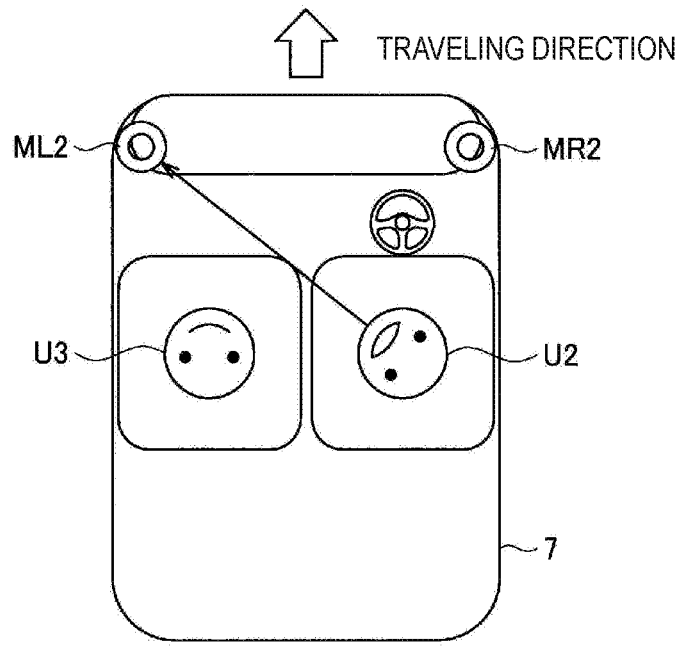
FIG. 6 is an explanatory diagram for explaining an application example 1.

FIG. 6 to FIG. 9 are explanatory diagrams for explaining the application example 1. As illustrated in FIG. 6, the car 7 includes a left microphone ML2 provided on a left side with respect to a traveling direction, and a right microphone MR2 provided on a right side with respect to the traveling direction, and a user U2 sits on a driver's seat of the car 7, and a user U3 sits on a passenger's seat.

Figure 7:
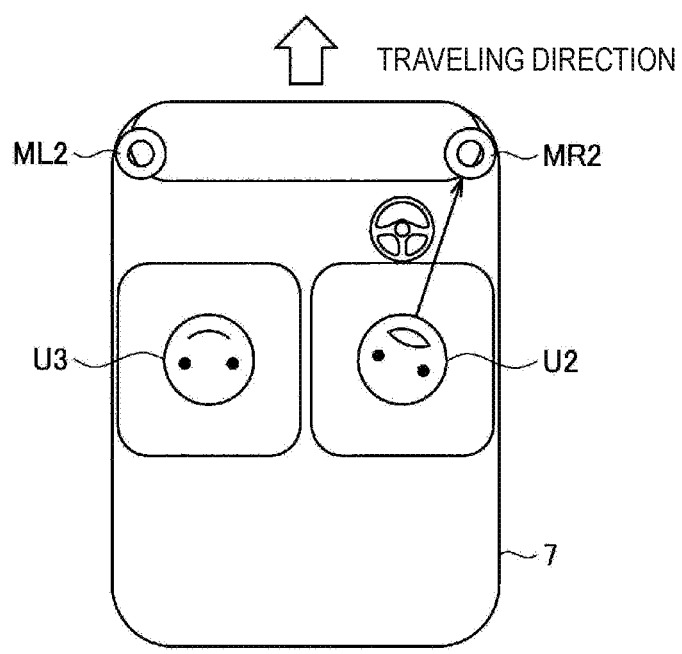
FIG. 7 is an explanatory diagram for explaining the application example 1.
Figure 8:
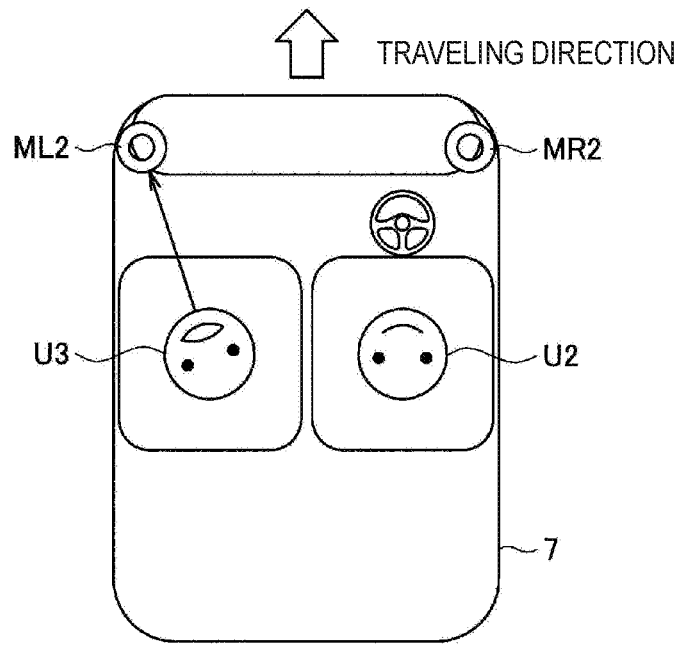
FIG. 8 is an explanatory diagram for explaining the application example 1.
Figure 9:
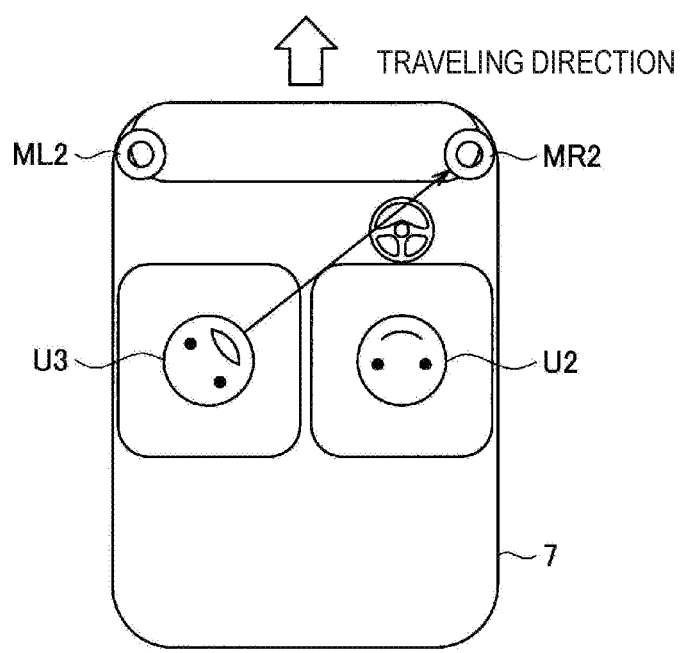
FIG. 9 is an explanatory diagram for explaining the application example 1.

The user U2 who sits on the driver's seat can make a speech toward the left microphone ML2 as illustrated in FIG. 6 and can make a speech toward the right microphone MR2 as illustrated in FIG. 7. Further, in a similar manner, the user U3 who sits on the passenger's seat can make a speech toward the left microphone ML2 as illustrated in FIG. 8 and can make a speech toward the right microphone MR2 as illustrated in FIG. 9.

Therefore, in a similar manner to the above-described embodiment, the in-vehicle device according to the present application example can acquire position information of the microphone which has accepted the speech by the user U2 or U3 and can perform response control on the basis of the position information.

Further, because the position of the seat on which the speaker sits and the microphones are fixed, by directions from the microphones to each seat being designed, the in-vehicle device according to the present application example can judge whether the seat on which the speaker sits is the driver's seat or the passenger's seat. In such a case, the in-vehicle device may control modal relating to output of a response in accordance with information relating to the speaker (for example, the seat of the speaker). Note that information of the modal may be included in the response information.

Table 3 is a table indicating a control example of the modal in accordance with the speaker. For example, in the case where the seat of the speaker is the driver's seat, only a response using sound may be output to prevent the response from inhibiting driving. Further, in the case where the seat of the speaker is the passenger's seat, a response using text may be added in addition to a response using sound. The response using text may be displayed on, for example, a display of the in-vehicle device or may be transmitted to an information terminal (such as, for example, a smartphone) possessed by the speaker and displayed at the information terminal.

TABLE 3

| Modal in accordance with speaker | |
|---|---|
| Seat | Modal |
| Driver's seat | Only response using sound |
| Passenger's seat | Response using sound + response using text |

4-2. Application Example 2

Further, the present technology may be applied to a device for home use (such as a content reproduction device and a robot) placed at home. In the following description, as the application example 2, an example where the present technology is applied to a device for home use will be described.

Figure 10:
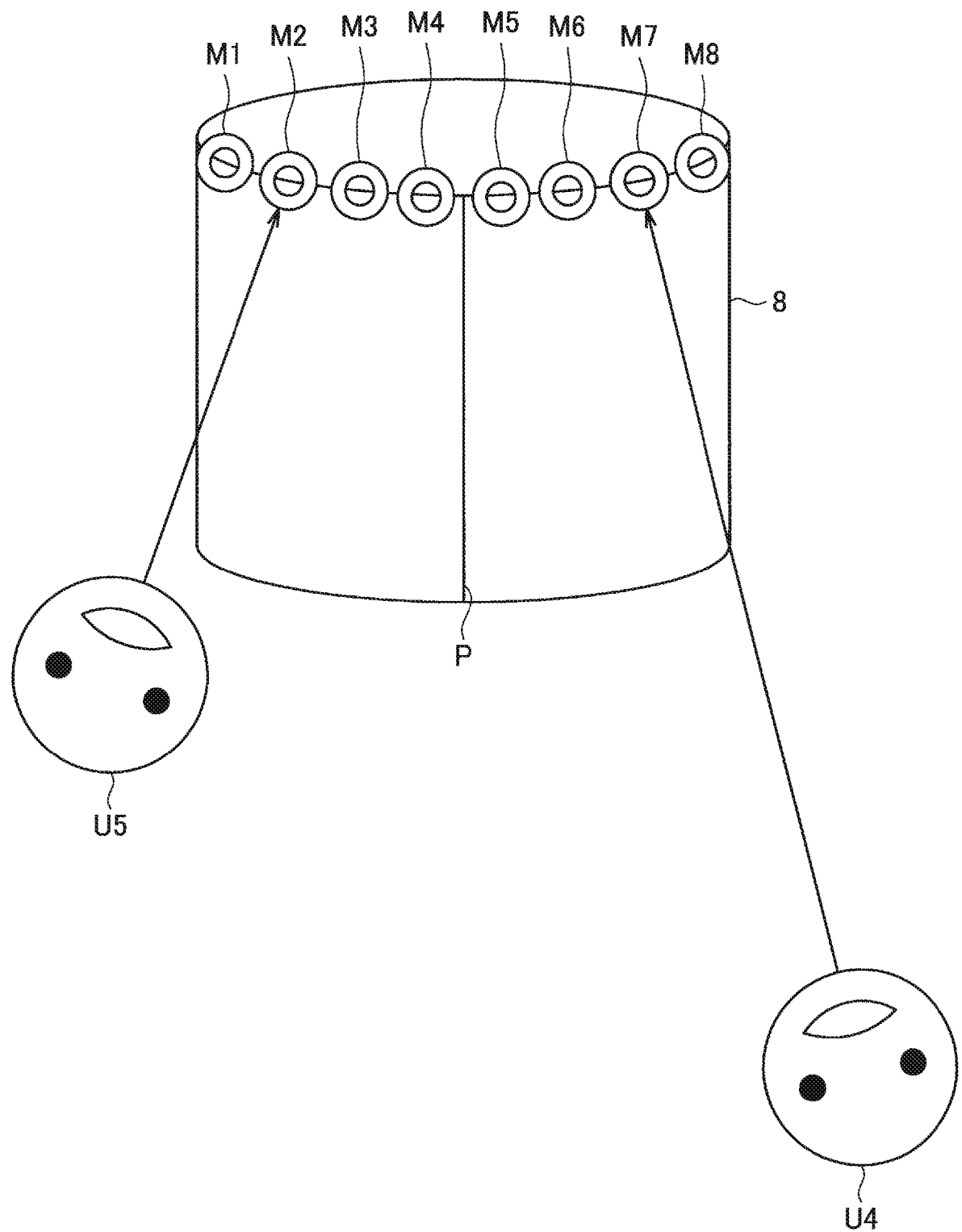
FIG. 10 is an explanatory diagram for explaining an application example 2.

FIG. 10 is an explanatory diagram for explaining the application example 2. As illustrated in FIG. 10, a device for home use 8 includes microphones M1 to M8. Further, a user U4 and a user U5 at home can make speeches from an arbitrary direction and from an arbitrary distance.

In a similar manner to the above-described embodiment, the device for home use 8 according to the present application example can acquire position information of the microphones which have accepted speeches by the user U2 and U3 and can perform response control on the basis of the position information.

The device for home use 8 may specify the microphone which has accepted the speech from the microphones M1 to M8 and may acquire position information in accordance with whether the microphone is located on the left side or on the right side of a reference position P. For example, in an example illustrated in FIG. 10, the position information relating to the speech by the user U4 is "right", and the position information relating to the speech by the user U5 is "left". Note that the device for home use 8 may acquire the position information in a range more precise than "left" and "right", in which case, a number of reference positions may be set.

4-3. Application Example 3

Further, while, in the above-described embodiment, an example has been described where one apparatus includes the respective functions described with reference to FIG. 4, the present technology is not limited to such an example. In the following description, as an application example 3, an example will be described where the above-described effects are realized by a plurality of apparatuses being coordinated with each other.

Figure 11:
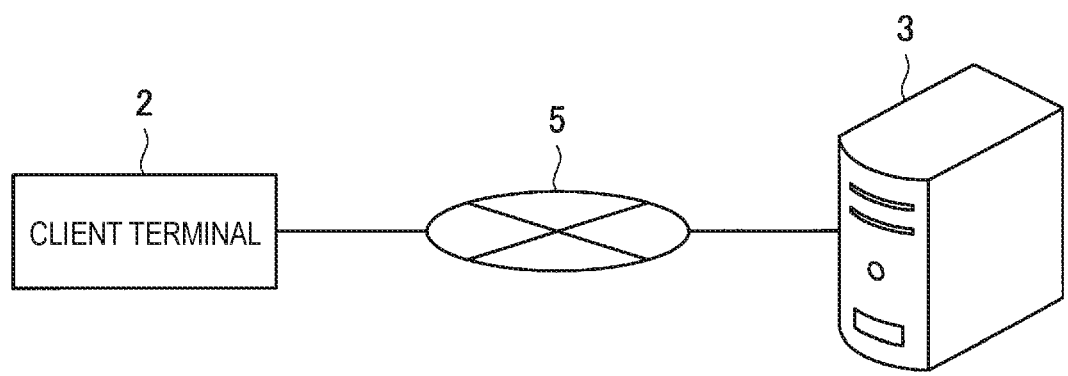
FIG. 11 is an explanatory diagram illustrating a configuration of an information processing system according to an application example 3.

FIG. 11 is an explanatory diagram illustrating a configuration of an information processing system according to the present application example. As illustrated in FIG. 11, the information processing system according to the present application example includes a client terminal 2, a server 3 and a communication network 5.

The client terminal 2 may be, for example, the neck band type wearable device described with reference to FIG. 1 to FIG. 3, the in-vehicle device described with reference to FIG. 6 to FIG. 9, the device for home use described with reference to FIG. 10, or the like.

Figure 12:
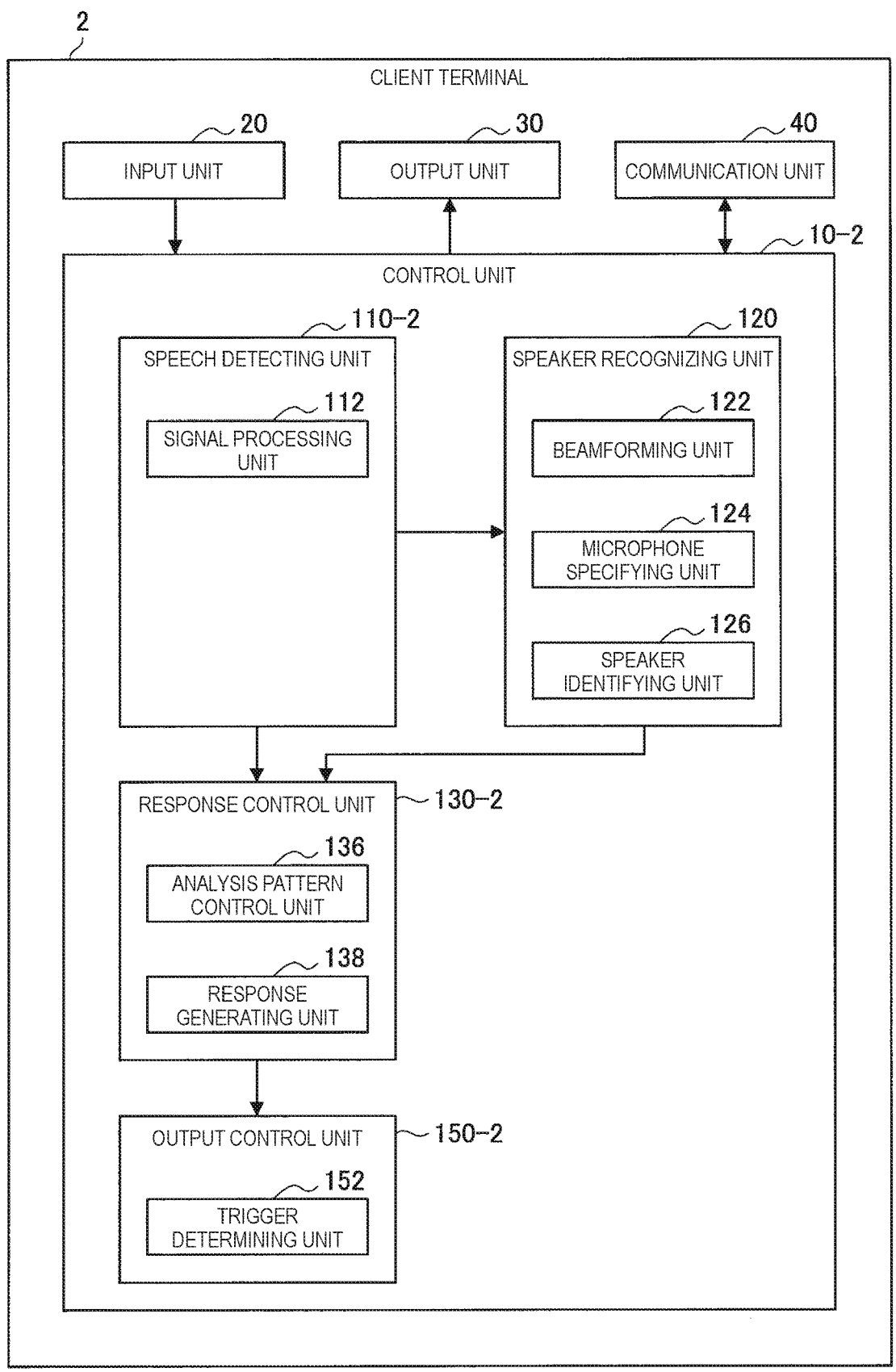
FIG. 12 is a block diagram illustrating a configuration example of a client terminal 2 according to the application example.

FIG. 12 is a block diagram illustrating a configuration example of the client terminal 2. As illustrated in FIG. 12, the client terminal 2 according to the present application example is an information processing apparatus including a control unit 10-2, an input unit 20, an output unit 30 and a communication unit 40. Note that, because the same reference numerals are assigned to components substantially similar to the respective components illustrated in FIG. 4 among the components illustrated in FIG. 12, description will be provided while the description is omitted as appropriate.

The control unit 10-2 illustrated in FIG. 12 controls each component of the client terminal 2. As illustrated in FIG. 12, the control unit 10-2 according to the present application example has functions as a speech detecting unit 110-2, a speaker recognizing unit 120, a response control unit 130-2 and an output control unit 150-2.

As illustrated in FIG. 12, the speech detecting unit 110-2 has a function as the signal processing unit 112 among the functions of the speech detecting unit 110 described with reference to FIG. 4, and does not have to have a function as the speech recognizing unit 114. Further, the speech detecting unit 110-2 causes sound data (speech sound) subjected to signal processing at the signal processing unit 112 to be transmitted to the server 3 via the communication unit 40.

While the response control unit 130-2 controls a response to the speech on the basis of the speech of the user and position information of the microphone which has accepted the speech in a similar manner to the response control unit 130 described with reference to FIG. 4, input/output destinations of information are partly different from those in the response control unit 130. As illustrated in FIG. 12, the response control unit 130-2 includes an analysis pattern control unit 136 and a response generating unit 138.

The analysis pattern control unit 136 controls the speech analysis pattern in a similar manner to the analysis pattern control unit 132 described with reference to FIG. 4. Because speech analysis is performed at the server 3, the analysis pattern control unit 136 according to the present application example may generate information indicating the analysis pattern in a form which can be transmitted to the server 3.

The response generating unit 138 generates response information in a similar manner to the response generating unit 134 described with reference to FIG. 4. The response generating unit 138 according to the present application example controls a response by generating response information relating to the response to the speech on the basis of an analysis result of the speech acquired from the server 3 via the communication unit 40 and the position information of the microphone. Note that the generated response information is transmitted to the server 3 and the output control unit 150-2. Therefore, the response generating unit 138 according to the present application example may generate response information in a form which can be transmitted to the server 3.

The output control unit 150-2 controls output by the output unit 30 in a similar manner to the output control unit 150 described with reference to FIG. 4. Further, as illustrated in FIG. 12, the output control unit 150-2 has a function as the trigger determining unit 152 among the functions of the output control unit 150 described with reference to FIG. 4, and does not have to have a function as the sound synthesizing unit 354.

Figure 13:
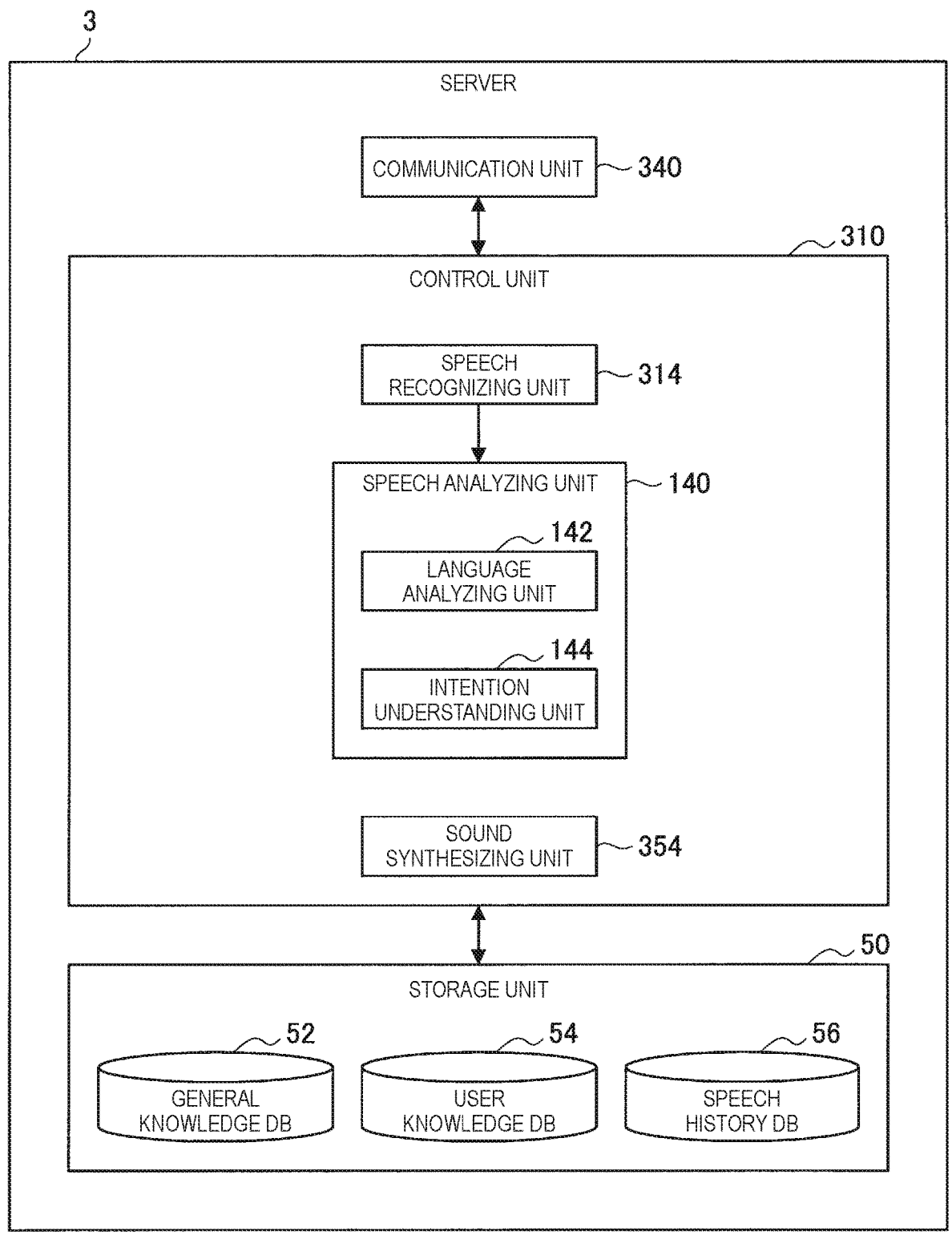
FIG. 13 is a block diagram illustrating a configuration example of a server 3 according to the application example.

FIG. 13 is a block diagram illustrating a configuration example of the server 3. As illustrated in FIG. 13, the server 3 according to the present application example is an information processing apparatus including a control unit 310, a communication unit 340 and a storage unit 50. Note that, because the same reference numerals are assigned to components substantially similar to the respective components illustrated in FIG. 4 among the components illustrated in FIG. 12, description will be provided while the description is omitted as appropriate.

The control unit 310 controls each component of the server 3. As illustrated in FIG. 13, the control unit 310 according to the present application example has functions as the speech analyzing unit 140, the speech recognizing unit 314 and the sound synthesizing unit 354.

The speech recognizing unit 314 performs speech recognition processing on the sound data (speech sound) received from the client terminal 2 via the communication unit 340 to convert the speech into text.

In the case where the response information received from the client terminal 2 via the communication unit 340 includes text information to be read, the sound synthesizing unit 354 converts the text information into sound data. Note that the converted sound data is transmitted to the client terminal 2 via the communication unit 340.

The communication unit 340 communicates information with other apparatuses.

The communication network 5 is a wired or wireless transmission path of information transmitted from an apparatus or a system connected to the communication network 5. For example, the communication network 5 may include a public network such as the Internet, a telephone network and a satellite communication network, various kinds of local area networks (LAN) including Ethernet (registered trademark), a wide area network (WAN), or the like. Further, the communication network 5 may include a private network such as an internet protocol-virtual private network (IP-VPN).

As illustrated in FIG. 11, the client terminal 2 and the server 3 are connected to each other via the communication network 5 and can perform communication with each other. An example of communication between the client terminal 2 and the server 3 will be described below. Note that, in the following example, an example in the case where the user makes a speech of "please show me schedule of my child"

at the speech position of "left" will be described. Further, in such an example, a case is assumed where the analysis pattern determined by the response control unit 130-2 is set such that the domain complement is applied, the slot complement is applied, and the personalization is applied.

First, information indicating the analysis pattern and sound data (binary data) are transmitted from the client terminal 2 to the server 3. FIG. 14 is an explanatory diagram illustrating an example of transmission data. In FIG. 14, the transmission data is separated with a character string of "multipart_boundary".

Note that, to simplify description, while a case where the sound data from start of the speech till the end of the speech is collectively transmitted is illustrated in the communication example illustrated in FIG. 14, the sound data may be sequentially transmitted. If the sound data is transmitted after all the sound data of the speech is acquired, because the sound data is transmitted after the speech of the user is finished, which may lead to delay, it is also possible to divide and transmit the sound data during the speech of the user and sequentially perform speech recognition as sequential speech recognition. In this case, a session from the client terminal 2 to the server 3 is established from the sound data at the start of the speech till the sound data at the end of the speech.

FIG. 15 is an explanatory diagram illustrating an example of information indicating the analysis pattern expressed in a JSON format. In FIG. 15, a value of a Domain tag of 1 indicates that the domain complement is applied, while 0 indicates that the complement is not applied. Further, a value of a Slot tag of 1 indicates that the slot complement is applied, while 0 indicates that the complement is not applied. Further, a value of a Personalization tag of 1 indicates that the personalization is applied, while 0 indicates that the personalization is not applied.

FIG. 16 is an explanatory diagram illustrating an example of values of sound data. As illustrated in FIG. 16, the sound data may be a binary code in hexadecimal.

Further, after speech recognition and speech analysis are performed by the server 3, a semantic frame is transmitted to the client terminal 2 as a speech analysis result. FIG. 17 is an explanatory diagram illustrating received data of the client terminal 2. In FIG. 17, the semantic frame is expressed in a JSON format. Table 4 is a table indicating description of a JSON tag in FIG. 17.

TABLE 4

| \multicolumn{3}{c}{JSON tag of received data} |
| --- | --- | --- |
| Tag | Description | Example |
| SpeechRecognitionResult | Speech recognition result | Schedule of child |
| SpeechAuthorInfo | Speaker identification result | Following information |
| UserId | User ID in speaker identification result | XXX |
| UserName | User name in speaker identification result | Taro Tanaka |
| UserAddress | Address in speaker identification result | TTT |
| SemanticFrameResults | Semantic frame result after speech analysis | Following information |
| Domain | Domain of semantic frame | SCHEDULE-VIEW (view of schedule) |
| Score | Reliability of analysis result | 0.8 |
| SlotSets | Slot information of semantic frame | Following information |
| ScheduleInfo | Schedule information | Following information |
| Subject | Subject name after speech analysis | NONE |
| DateValue | Value of date | NONE |

Note that NONE in Subject in FIG. 17 and Table 4 means that information of a subject is not included in the speech. Further. NONE in DateValue in FIG. 17 and Table 4 means that specific information of date is not included in the speech.

Further, the response information generated by the response generating unit 138 of the client terminal 2 on the basis of the analysis result of the speech is transmitted to the server 3 and converted into sound data by the sound synthesizing unit 354 of the server 3 and returned to the client terminal 2.

The response information transmitted from the client terminal 2 to the server 3 can be expressed in the JSON format, for example, as follows.
{"ResponceText": "Taro's schedule is XXX"}

Further, the sound data received by the client terminal 2 from the server 3 may be binary data in accordance with a sound format of sound synthesis.

Note that, in the case where the client terminal 2 includes a sound synthesizing unit, it is not necessary to communicate response information and sound data.

4-4. Application Example 4

A configuration example in the case where the present technology is applied to an information system including a plurality of apparatuses is not limited to the above-described application example 3. Another configuration example will be described below as an application example 4. Because the present application example is substantially similar to the above-described embodiment and the application example 3 except that response control is performed by the server, a difference will be mainly described, and description of substantially similar points will be omitted as appropriate. Note that it is assumed that a client terminal 2-2 and a server 3-2 described below are connected to each other via the communication network 5 and can perform communication with each other in a similar manner to the client terminal 2 and the server 3 described with reference to FIG. 11.

Figure 18:
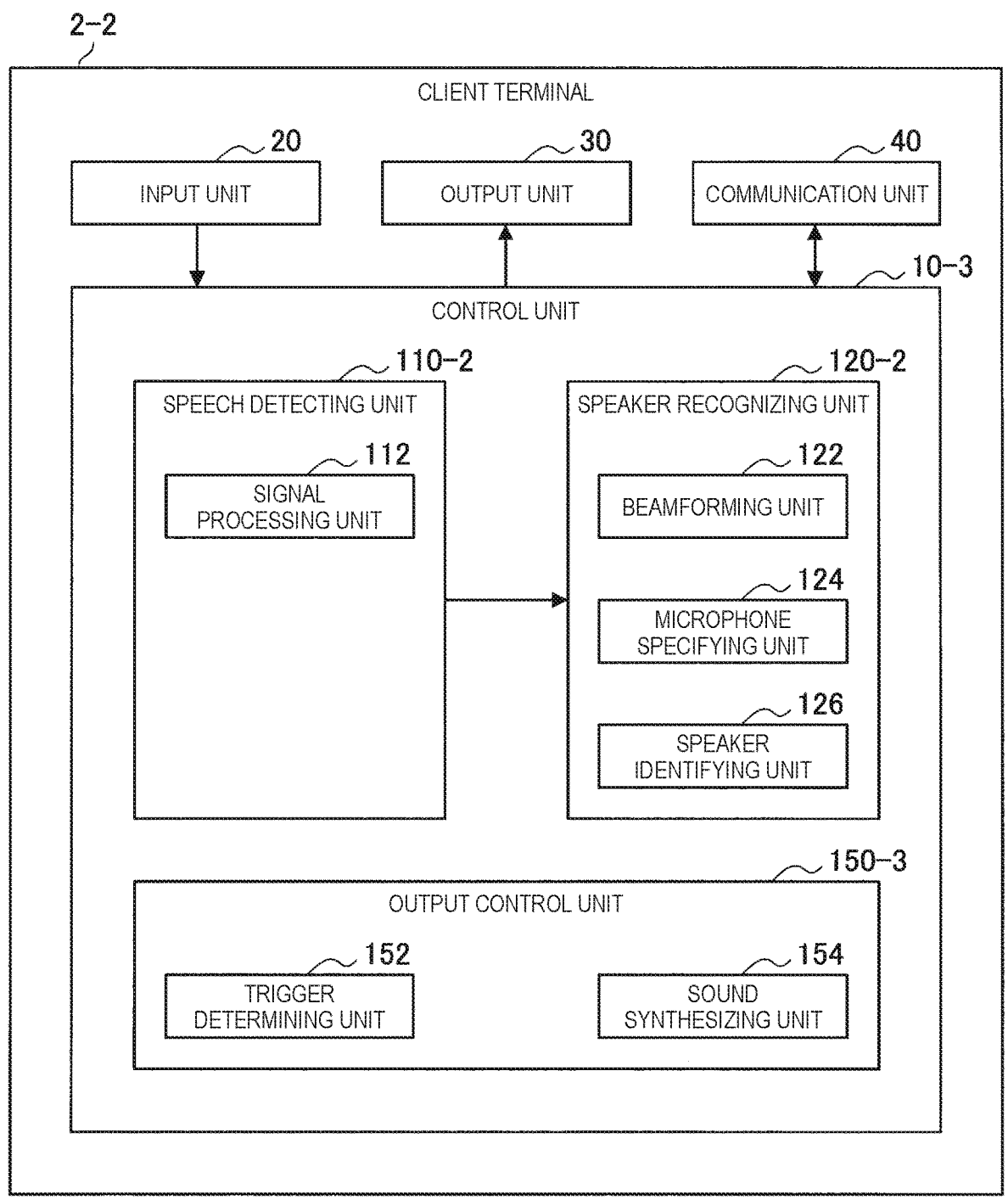
FIG. 18 is a block diagram illustrating a configuration example of a client terminal 2-2 according to an application example 4.

FIG. 18 is a block diagram illustrating a configuration example of the client terminal 2-2 according to the present application example. As illustrated in FIG. 18, the client terminal 2-2 according to the present application example is an information processing apparatus including a control unit 10-3, an input unit 20, an output unit 30 and a communication unit 40. Note that, because the same reference numerals are assigned to components substantially similar to the respective components illustrated in FIG. 4 and FIG. 12 among the components illustrated in FIG. 18, description will be provided while the description is omitted as appropriate.

The control unit 10-3 according to the present application example controls each component of the client terminal 2-2. As illustrated in FIG. 18, the control unit 10-3 according to the present application example has functions as the speech detecting unit 110-2, a speaker recognizing unit 120-2 and an output control unit 150-3 and does not have to have a function as the response control unit.

Therefore, the speaker recognizing unit 120-2 according to the present application example is different from the speaker recognizing unit 120 illustrated in FIG. 4 in that the speaker recognizing unit 120-2 causes position information of the microphone which has accepted the speech and information of the speaker to be transmitted to the server 3-2 via the communication unit 40.

Further, the output control unit 150-3 (an example of the processing unit) according to the present application example is different from the output control unit 150 illustrated in FIG. 4 in that the output control unit 150-3 performs output control processing of a response on the basis of the response information received from the server 3-2 via the communication unit 40.

Figure 19:
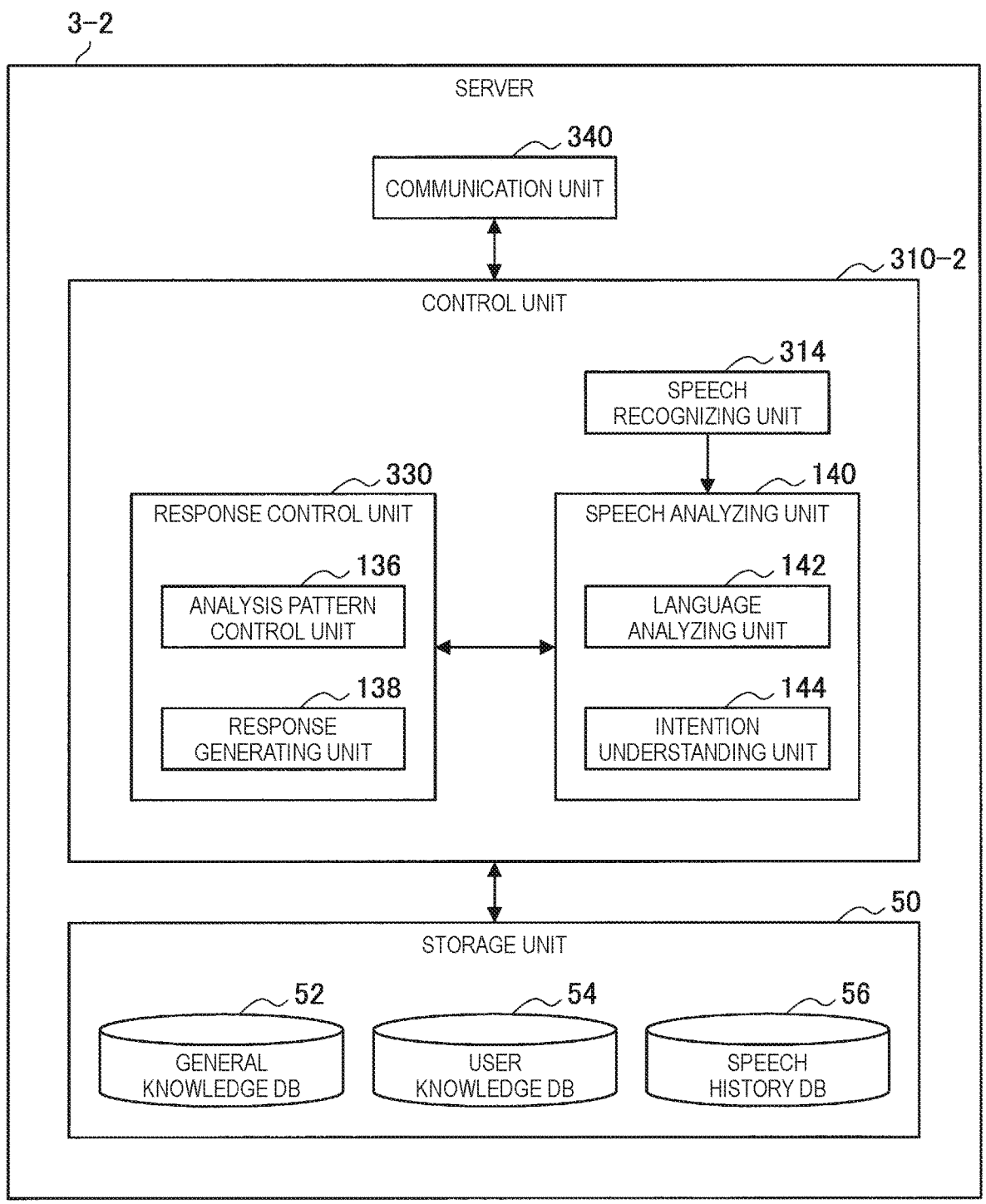
FIG. 19 is a block diagram illustrating a configuration example of a server 3-2 according to the application example.

FIG. 19 is a block diagram illustrating a configuration example of the server 3-2 according to the present application example. As illustrated in FIG. 19, the server 3-2 according to the present application example is an information processing apparatus including a control unit 310-2, a communication unit 340 and a storage unit 50. Note that, because the same reference numerals are assigned to components substantially similar to the respective components illustrated in FIG. 4 and FIG. 13 among the components illustrated in FIG. 19, description will be provided while the description is omitted as appropriate.

The control unit 310-2 controls each component of the server 3-2. As illustrated in FIG. 19, the control unit 310-2 according to the present application example has functions as the speech analyzing unit 140, the speech recognizing unit 314 and the response control unit 330. Because the control unit 310-2 includes the response control unit 330, the control unit 310-2 also functions as an acquiring unit which receives (acquires) position information of the microphone which has accepted the speech from the client terminal 2, via the communication unit 340.

The response control unit 330 controls a response to the speech on the basis of the speech of the user and position information of the microphone which has accepted the speech in a similar manner to the response control unit 130-2 described with reference to FIG. 12. The response control unit 330 according to the present application example is different from the response control unit 130-2 illustrated in FIG. 12 in that the response control unit 330 controls a response on the basis of position information of the microphone which has accepted the speech, received from the client terminal 2. Further, the response control unit 330 according to the present application example is different from the response control unit 130-2 illustrated in FIG. 12 in that the response control unit 330 causes the generated response information to be transmitted to the client terminal 2. Note that, in the case where the server 3-2 includes a sound synthesizing unit, the response information transmitted from the server 3-2 to the client terminal 2-2 may be sound data.

As described above, according to the present application example, it is possible to make a response on the basis of the position information of the microphone which has accepted the speech even if the client terminal 2-2 does not have a response control function.

5. Hardware Configuration Example

Figure 20:
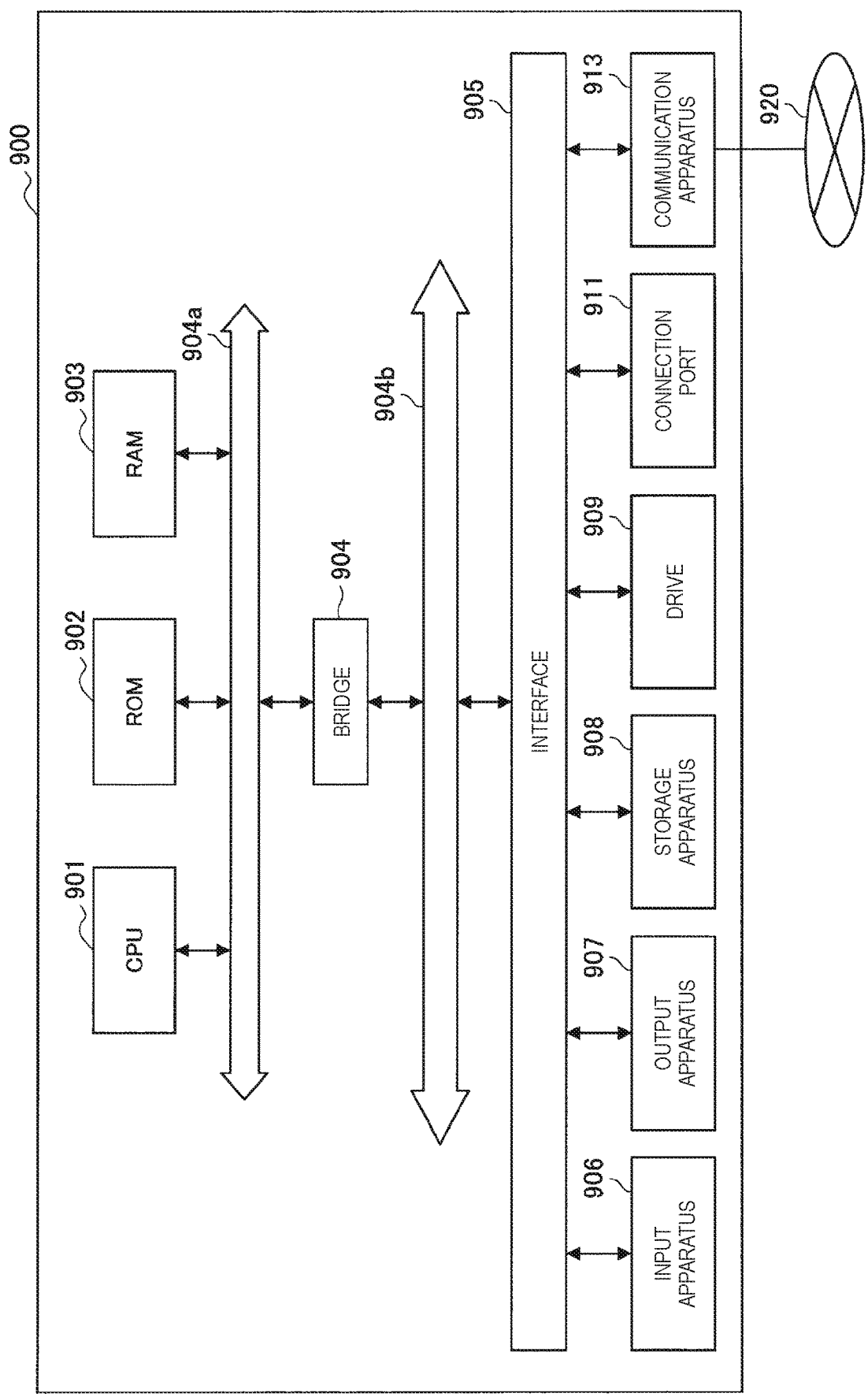
FIG. 20 is an explanatory diagram illustrating a hardware configuration example.

The embodiment of the present disclosure has been described hitherto. Finally, a hardware configuration of an information processing apparatus according to the present embodiment will be described with reference to FIG. 20. FIG. 20 is a block diagram illustrating an example of the hardware configuration of the information processing apparatus according to the present embodiment. Meanwhile, an information processing apparatus 900 illustrated in FIG. 20 may realize the information processing apparatus 1, the client terminals 2 and 2-2, and the servers 3 and 3-2 illustrated in each of FIGS. 4, 12, 13, 18, and 19, for example. Information processing by the information processing apparatus 1, the client terminals 2 and 2-2, and the servers 3 and 3-2 according to the present embodiment is realized according to cooperation between software and hardware described below.

As illustrated in FIG. 20, the information processing apparatus 900 includes a central processing unit (CPU) 901, a read only memory (ROM) 902, a random access memory (RAM) 903, and a host bus 904a In addition, the information processing apparatus 900 includes a bridge 904, an external bus 904b, an interface 905, an input apparatus 906, an output apparatus 907, a storage apparatus 908, a drive 909, a connection port 911, a communication apparatus 913, and a sensor 915. The information processing apparatus 900 may include a processing circuit such as a DSP or an ASIC instead of the CPU 901 or along therewith.

The CPU 901 functions as an arithmetic processing apparatus and a control apparatus and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control units 10, 10-2, 10-3, 310, and 310-2, for example.

The CPU 901, the ROM 902, and the RAM 903 are mutually connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input apparatus 906 is realized by an apparatus through which a user inputs information, such as a mouse, a keyboard, a touch panel, a button, a microphone, a switch, and a lever, for example. In addition, the input apparatus 906 may be a remote control apparatus using infrared ray or other electric waves, or external connection equipment such as a cellular phone or a PDA corresponding to an operation of the information processing apparatus 900, for example. Furthermore, the input apparatus 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input apparatus 906. The input apparatus 906 can form the input unit 20, for example.

The output apparatus 907 is formed by an apparatus that may visually or aurally notify the user of acquired information. As such apparatuses, there are a display apparatus such as a CRT display apparatus, a liquid crystal display apparatus, a plasma display apparatus, an EL display apparatus, or a lamp, a sound output apparatus such as a speaker and a headphone, a printer apparatus, and the like. The output apparatus 907 outputs results acquired through various processes performed by the information processing apparatus 900, for example. Specifically, the display apparatus visually displays results acquired through various processes performed by the information processing apparatus 900 in various forms such as text, images, tables, and graphs. On the other hand, the sound output apparatus converts audio signals including reproduced sound data, audio data, and the like into analog signals and aurally outputs the analog signals. The display apparatus 907 may form the output unit 30, for example.

The storage apparatus 908 is an apparatus for data storage, formed as an example of a storage unit of the information processing apparatus 900. For example, the storage apparatus 908 is realized by a magnetic storage device such as an HDD, a semiconductor storage device, an optical storage device, a magneto-optical storage device, or the like. The storage apparatus 908 may include a storage medium, a recording apparatus for recording data on the storage medium, a reading apparatus for reading data from the storage medium, a deletion apparatus for deleting data recorded on the storage medium, and the like. The storage apparatus 908 stores programs and various types of data executed by the CPU 901, various types of data acquired from the outside, and the like. The storage apparatus 908 may form the storage unit 50, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information on the removable storage medium.

The connection port 911 is an interface connected with external equipment and is a connector to the external equipment through which data may be transmitted through a universal serial bus (USB) and the like, for example.

The communication apparatus 913 is a communication interface formed by a communication device for connection to a network 920 or the like, for example. The communication apparatus 913 is a communication card or the like for a wired or wireless local area network (LAN), long term evolution (LTE), Bluetooth (registered trademark), or wireless USB (WUSB), for example. In addition, the communication apparatus 913 may be a router for optical communication, a router for asymmetric digital subscriber line (ADSL), various communication modems, or the like. For example, the communication apparatus 913 may transmit/receive signals and the like to/from the Internet and other communication apparatuses according to a predetermined protocol such as, for example, TCP/IP. The communication apparatus 913 may form the communication units 40 and 340, for example.

Further, the network 920 is a wired or wireless transmission path of information transmitted from apparatuses connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

As described above, according to the embodiment of the present disclosure, it is possible to make a response desired by the user while reducing load on the user.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquiring unit configured to acquire position information of a microphone which has accepted a speech; and a response control unit configured to control a response to the speech on a basis of the speech and the position information.

(2)

The information processing apparatus according to (1), in which the response control unit controls an analysis pattern of the speech on a basis of the position information and controls the response on a basis of an analysis result of the speech.

(3)

The information processing apparatus according to (2), in which the response control unit controls the analysis pattern of the speech by determining whether or not to apply the analysis pattern on a basis of the position information.

(4)

The information processing apparatus according to (3), in which the analysis pattern includes at least one of domain complement, slot complement or personalization.

(5)

The information processing apparatus according to any one of (1) to (4), in which the response control unit controls an information amount to be included in the response on a basis of the position information.

(6)

The information processing apparatus according to any one of (1) to (5), in which the response control unit controls the response so that the position information corresponds to a time direction relating to the response.

(7)

The information processing apparatus according to (6), in which the response control unit controls the response so that information included in the response in a case where the position information is right is information later than information included in the response in a case where the position information is left.

(8)

The information processing apparatus according to any one of (1) to (7), in which the response control unit controls the response so that the position information corresponds to space relating to the response.

(9)

The information processing apparatus according to any one of (1) to (8), in which the response control unit controls an output timing of the response on a basis of the position information.

(10)

The information processing apparatus according to any one of (1) to (9), in which the response control unit determines whether or not to add additional information to the response on a basis of the position information.

(11)

The information processing apparatus according to (10), in which the additional information includes information of a reason relating to the response or supplementary information relating to the response.

(12)

The information processing apparatus according to any one of (1) to (11), in which the response control unit controls a search range relating to the response on a basis of the position information.

(13)

The information processing apparatus according to any one of (1) to (12), in which the response control unit controls the response on a basis of a predetermined function in accordance with the position information.

(14)

The information processing apparatus according to any one of (1) to (13), in which the response control unit controls the response further on a basis of information relating to a speaker of the speech.

(15)

An information processing apparatus including:

a communication unit configured to transmit position information of a microphone which has accepted a speech and receive response information relating to a response to the speech, the response information being based on the speech and the position information; and a processing unit configured to perform processing on a basis of the response information.

(16)

An information processing method including:

acquiring position information of a microphone which has accepted a speech; and controlling, by a processor, a response to the speech on a basis of the speech and the position information.

(17)

An information processing method including:

transmitting position information of a microphone which has accepted a speech and receiving response information relating to a response to the speech, the response information being based on the speech and the position information; and performing processing by a processor on a basis of the response information.

REFERENCE SIGNS LIST 1 information processing apparatus
2 client terminal
3 server
5 communication network
7 car
8 device for home use
10 control unit
20 input unit
30 output unit
40 communication unit
50 storage unit
110 speech detecting unit
112 signal processing unit
114 speech recognizing unit
120 speaker recognizing unit
122 beamforming unit
124 microphone specifying unit
126 speaker identifying unit
130 response control unit
132 analysis pattern control unit
134 response generating unit
136 analysis pattern control unit
138 response generating unit
140 speech analyzing unit
142 language analyzing unit
144 intention understanding unit
150 output control unit
152 trigger determining unit
154 sound synthesizing unit
310 control unit
314 speech recognizing unit
330 response control unit
340 communication unit
354 sound synthesizing unit

The invention claimed is:

1. An information processing apparatus comprising:
    an acquiring unit configured to acquire position information of a respective microphone among a plurality of microphones which has accepted a speech; and
    a response control unit configured to control a response to the speech based on an analysis result of the speech and the position information of the respective microphone,
    wherein the response control unit determines the analysis result of the speech according to the speech and a respective analysis pattern of the speech that is based on the position information of the respective microphone, the respective analysis pattern being determined from a plurality of analysis patterns, wherein the response control unit controls the response so that the position information of the respective microphone corresponds to a time direction relating to the response, wherein the response control unit controls the response so that when the position information of the respective microphone indicates a first position, the information included in the response corresponds to a first time in the time direction, and when the position information of the respective microphone indicates a second position, the information included in the response corresponds to a second time in the time direction different from the first time, and wherein the acquiring unit and the response control unit are each implemented via at least one processor.

2. The information processing apparatus according to claim 1, wherein the respective analysis pattern is determined as
an analysis pattern that includes at least one of domain complement, slot complement, or personalization, or
an analysis pattern that does not include any of the domain complement, the slot complement, or the personalization.

3. The information processing apparatus according to claim 1, wherein the response control unit controls an information amount to be included in the response based on the position information of the respective microphone.

4. The information processing apparatus according to claim 1, wherein the response control unit controls the response so that the position information of the respective microphone corresponds to space relating to the response.

5. The information processing apparatus according to claim 1, wherein the response control unit controls an output timing of the response based on the position information.

6. The information processing apparatus according to claim 1, wherein the response control unit determines whether or not to add additional information to the response based on the position information.

7. The information processing apparatus according to claim 6, wherein the additional information includes information of a reason relating to the response or supplementary information relating to the response.

8. The information processing apparatus according to claim 1, wherein the response control unit controls a search range relating to the response based on the position information of the respective microphone.

9. The information processing apparatus according to claim 1, wherein the response control unit controls the response based on a predetermined function in accordance with the position information of the respective microphone.

10. The information processing apparatus according to claim 1, wherein the response control unit controls the response further based on information relating to a speaker of the speech.

11. An information processing apparatus comprising:
a communication unit configured to
transmit position information of a respective microphone among a plurality of microphones which has accepted a speech, and
receive response information relating to a response to the speech, the response information being based on an analysis result of the speech and the position information of the respective microphone; and
a processing unit configured to perform processing based on the response information,
wherein the analysis result of the speech is determined according to the speech and a respective analysis pattern of the speech that is based on the position information of the respective microphone, the respective analysis pattern being determined from a plurality of analysis patterns,
wherein the communication unit receives the response information so that the position information of the respective microphone corresponds to a time direction relating to the response,
wherein the processing unit performs the processing based on the response information so that when the position information of the respective microphone indicates a first position, the information included in the response corresponds to a first time in the time direction, and when the position information of the respective microphone indicates a second position, the information included in the response corresponds to a second time in the time direction different from the first time, and
wherein the communication unit and the processing unit are each implemented via at least one processor.

12. An information processing method comprising:
acquiring position information of a respective microphone among a plurality of microphones which has accepted a speech; and
controlling, by a processor, a response to the speech based on an analysis result of the speech and the position information of the respective microphone,
wherein the analysis result of the speech is determined according to the speech and a respective analysis pattern of the speech that is based on the position information of the respective microphone, the respective analysis pattern being determined from a plurality of analysis patterns,
wherein the response is controlled so that the position information of the respective microphone corresponds to a time direction relating to the response, and
wherein the response is controlled so that when the position information of the respective microphone indicates a first position, the information included in the response corresponds to a first time in the time direction, and when the position information of the respective microphone indicates a second position, the information included in the response corresponds to a second time in the time direction different from the first time.

13. An information processing method comprising:
transmitting position information of a respective microphone among a plurality of microphones which has accepted a speech;
receiving response information relating to a response to the speech, the response information being based on an analysis result of the speech and the position information of the respective microphone; and
performing processing by a processor based on the response information, wherein the analysis result of the speech is determined according to the speech and a respective analysis pattern of the speech that is based on the position information of the respective microphone, the respective analysis pattern being determined from a plurality of analysis patterns, wherein the response information is received so that the position information of the respective microphone corresponds to a time direction relating to the response, and wherein the processing is performed based on the response information so that when the position information of the respective microphone indicates a first position, the information included in the response corresponds to a first time in the time direction, and when the position information of the respective microphone indicates a second position, the information included in the response corresponds to a second time in the time direction different from the first time.

\* \* \* \* \*